United States Patent [19]
Stephenson, Jr. et al.

[11] 3,727,186
[45] Apr. 10, 1973

[54] METHOD OF AND APPARATUS FOR CREDIT VERIFICATION

[75] Inventors: Kenrick O. Stephenson, Jr., Upper Montclair, N.J.; George D. Telepko, Rydal, Pa.; C. Philip Strakosch, Tappan, N.Y.

[73] Assignee: Digital Data Systems Corporation

[22] Filed: Feb. 26, 1971

[21] Appl. No.: 119,254

[52] U.S. Cl. ............................. 340/149 A, 179/2 CA
[51] Int. Cl. ........................... G06k 5/00, H04q 5/00
[58] Field of Search ................ 235/61.7 B, 61.11 A, 235/61.11 C; 340/149 R, 149 A, 152 R; 179/2 CA

[56] References Cited

UNITED STATES PATENTS

| | | | |
|---|---|---|---|
| 3,470,358 | 9/1969 | Sallach | 235/61.11 C |
| 3,559,175 | 1/1971 | Pomeroy | 340/149 A |
| 3,564,210 | 2/1971 | Presti | 340/149 A X |
| 3,594,727 | 7/1971 | Braun | 340/152 R |
| 3,576,539 | 4/1971 | Huber | 340/152 R |
| 3,544,769 | 12/1970 | Hedin | 340/149 R X |

Primary Examiner—Donald J. Yusko
Attorney—Woodcock, Washburn, Kurtz & Mackiewicz

[57] ABSTRACT

A credit verification system comprising a multiplicity of point-of-sale terminals and a programmed central processing unit with data storage equipment communicating with the terminals for automatically performing a credit check on the accounts corresponding to the credit cards inserted in the terminals. Each of the terminals is adapted to receive and operate with a plurality of different credit cards representing different credit card plans with the data storage equipment storing account information for each of the credit plans. After the various credit checks are performed by the central processing unit, the transaction authorization is communicated to the terminals. In certain instances, the central processing unit may refer the transaction to a video display terminal where an operator establishes voice communication with an external authorization center.

14 Claims, 23 Drawing Figures

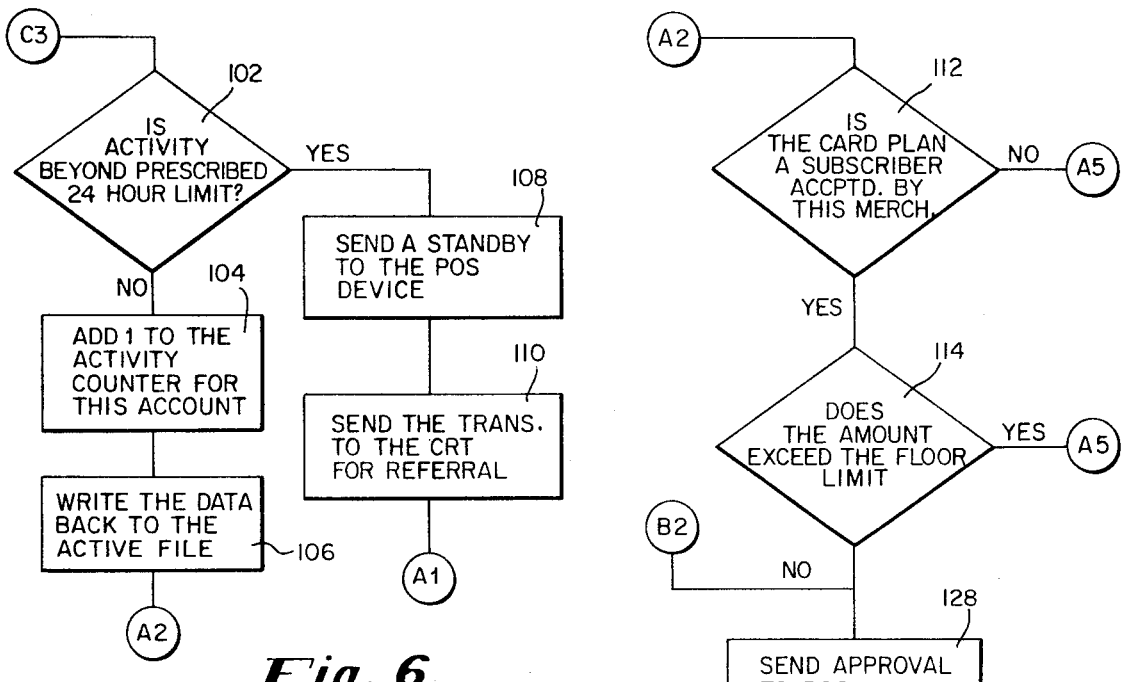
Fig. 6
Fig. 7
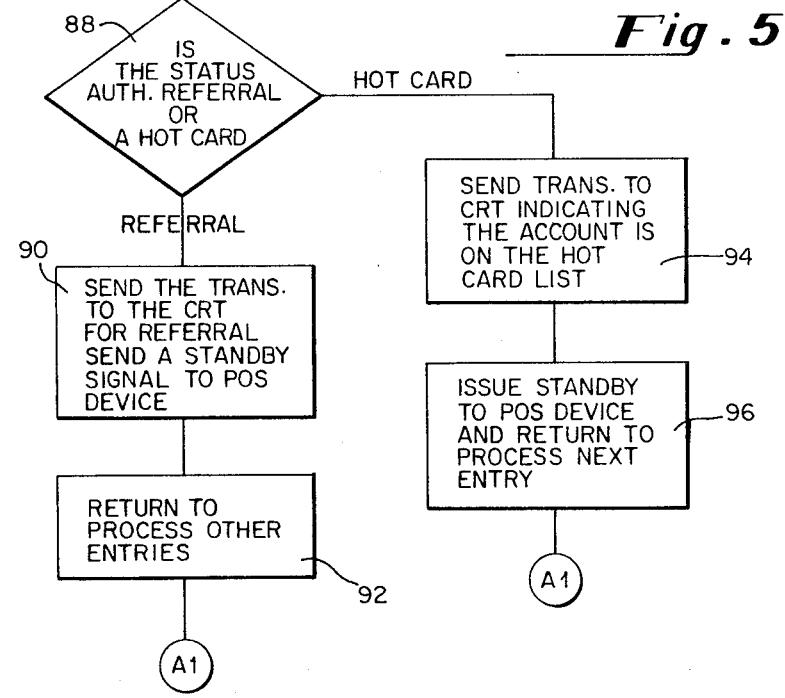
Fig. 5

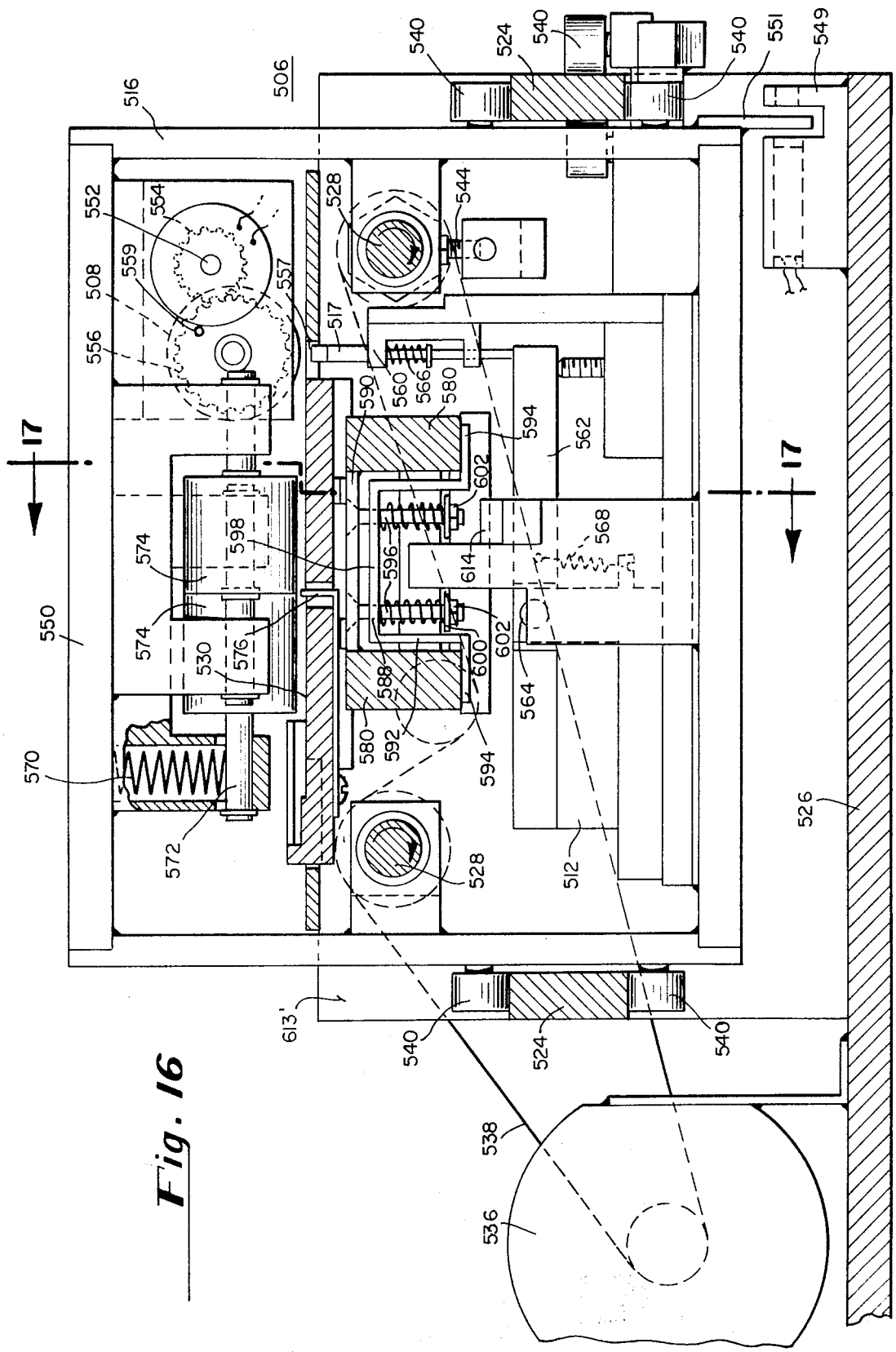

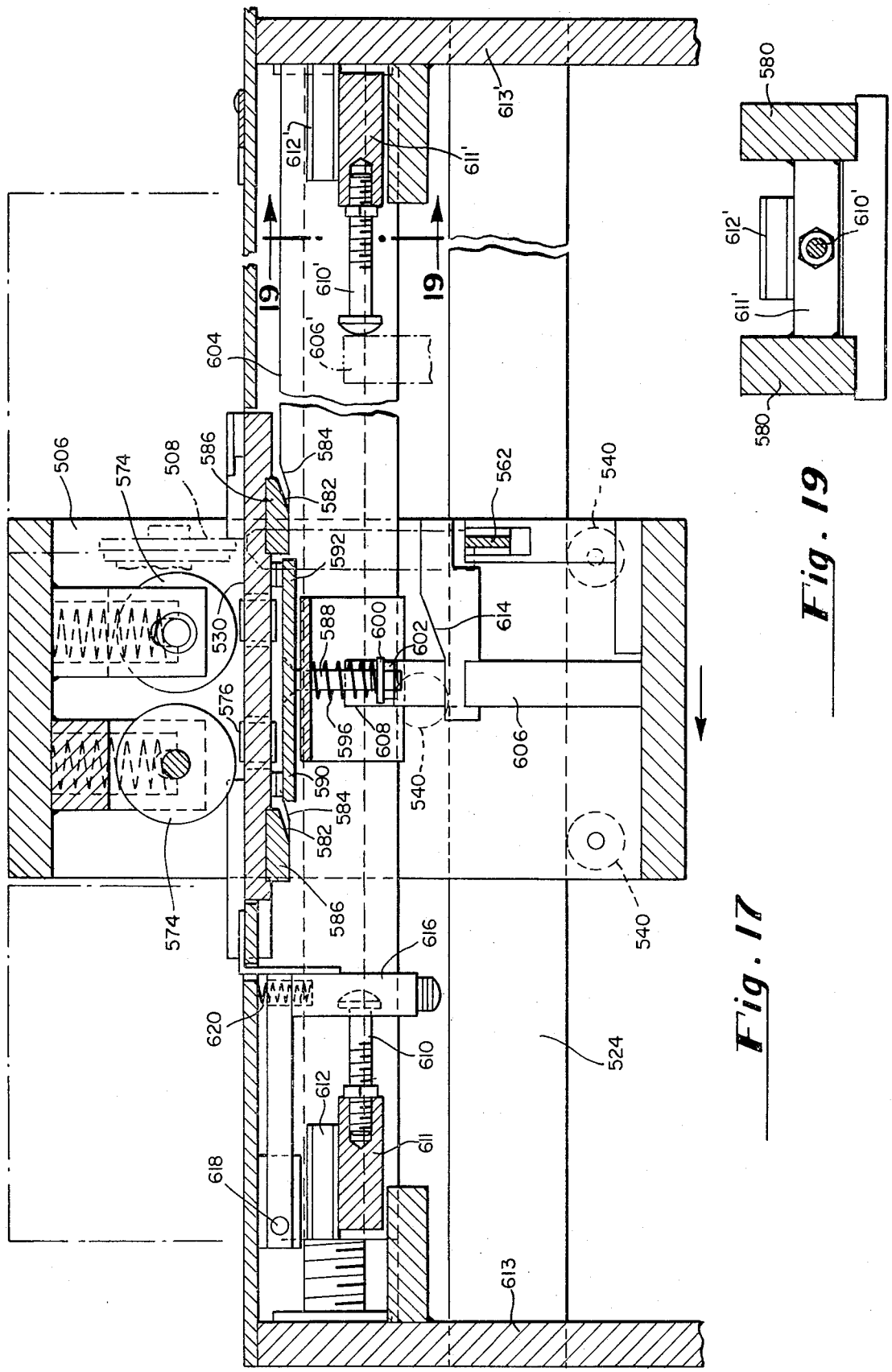

METHOD OF AND APPARATUS FOR CREDIT VERIFICATION

BACKGROUND OF THE INVENTION

This invention relates to credit verification systems, and more particularly, to systems for verifying the credit of credit card accounts.

The credit loss arising out of the use of credit cards may be broken down into four categories. First, there is the general fraud category which includes those situations where a credit card is deliberately misused to obtain goods or services without payment. A second category referred to as skip encompasses those card holders who avoid payment by moving without leaving a forwarding address. Bankruptcy is a third category and the inability or refusal to pay incident to changes in employment, military induction, health failure and death make up the fourth category. The losses which may be attributed to the various categories represent an overwhelming dollar volume.

It therefore becomes increasingly clear that an automated system for checking credit for credit card accounts is a necessity. Slow and expensive clerical checking is completely impractical.

THE PRIOR ART

Automated credit verification systems used with credit cards have been developed in response to this demand. One such system is the Creditmaster (TM) system which is manufactured and sold by Digital Data Systems Corporation. This system which is particularly useful with department store credit card plans includes the use of a plurality of point-of-sale terminals or counter units which communicate with a central processing unit in the store. The central processing unit performs various credit checks on the account identified by the transaction terminals. Although this system has met with overwhelming commercial acceptance, it is designed and limited to a single credit card plan. In other words, the system performs credit checks on the accounts represented by credit cards issued by a single credit card plan or department store.

There is however a need for a system which will check the credit of accounts in various credit card plans. Bank and travel credit card plans are a case in point. Since merchants will frequently honor more than one such credit card plan, there is a need to check the credit of credit card holder regardless of the particular credit plan. If a Creditmaster system approach were utilized to solve the problem of such a merchant, the merchant would be burdened with one point-of-sale terminal for each credit card plan honored with each terminal communicating with a separate central processing facility for the corresponding credit card plan. The impracticality of such an arrangement is apparent when the counterspace required for the various terminals is considered. Furthermore, great expense would be involved to the various credit plans since each would be required to maintain its own central processing facility.

When an authorization function has been provided by a central processing unit in the prior art, problems have arisen in appropriately coordinating the authorization with the credit card in the terminal. In other words, the authorization from the central processing facility might be received at the terminal after the credit card initiating the credit check has been removed from the terminal and another credit card has been inserted into the terminal initiating a subsequent credit check. Obviously, a false authorization could result.

SUMMARY OF THE INVENTION

In accordance with one aspect of the invention, a system for verifying the credit of credit card accounts in a plurality of credit plans having different credit authorization requirements is provided. The system comprises a plurality of point-of-transaction terminals, each of the terminals adapted to transmit signals representing credit card plans and account number to a central processing means. The credit checking is performed by the central processing means after first identifying the appropriate account number and appropriate credit plan. The terminals and the central processing means are linked by communication means.

In accordance with another aspect of the invention, the signal transmitted to the central processing means also represents terminal data to enable the central processing means to identify the appropriate terminal and determine if the credit authorization requirements of the identified terminal have been satisfied. After the credit check is performed, the central processing means generates signals which are transmitted to the appropriate terminal so as to authorize the transaction. In certain instances, the entire transaction may be referred to a visual display authorization means which is attended by an operator. Additional communication means may then be provided to link the visual display with the terminals and the central processing means and with the credit granting agency.

In accordance with another aspect of the invention, various credit checks are programmed into the central processing means. For example, check digit validation may be performed by the central processing means. Other checks involve the determination of extraordinary activity in the identified account as well as a check of the transaction amount against the floor limits for an identified terminal.

In accordance with another important aspect of the invention, a buffer file is provided at the central processing means with an entry for each terminal. The buffer file includes fixed information relating to the terminal and variable information describing the input transaction. Such a file will prevent authorization of a transaction after the corresponding credit card has been removed from the transmitting terminal and another credit card inserted.

These and other aspects of the invention are set forth in the following specification with reference to the drawings.

BRIEF DESCRIPTION OF THE DRAWINGS

FIGS. 2–11 are flow charts illustrating on-line system processing;

FIG. 16 is a view taken along section line 16—16 of FIG. 15;

FIG. 17 is a view taken along section line 17—17 of FIG. 15;

FIG. 19 is a view taken along section line 19—19 of FIG. 17.

TABLE OF CONTENTS

Figure 1:
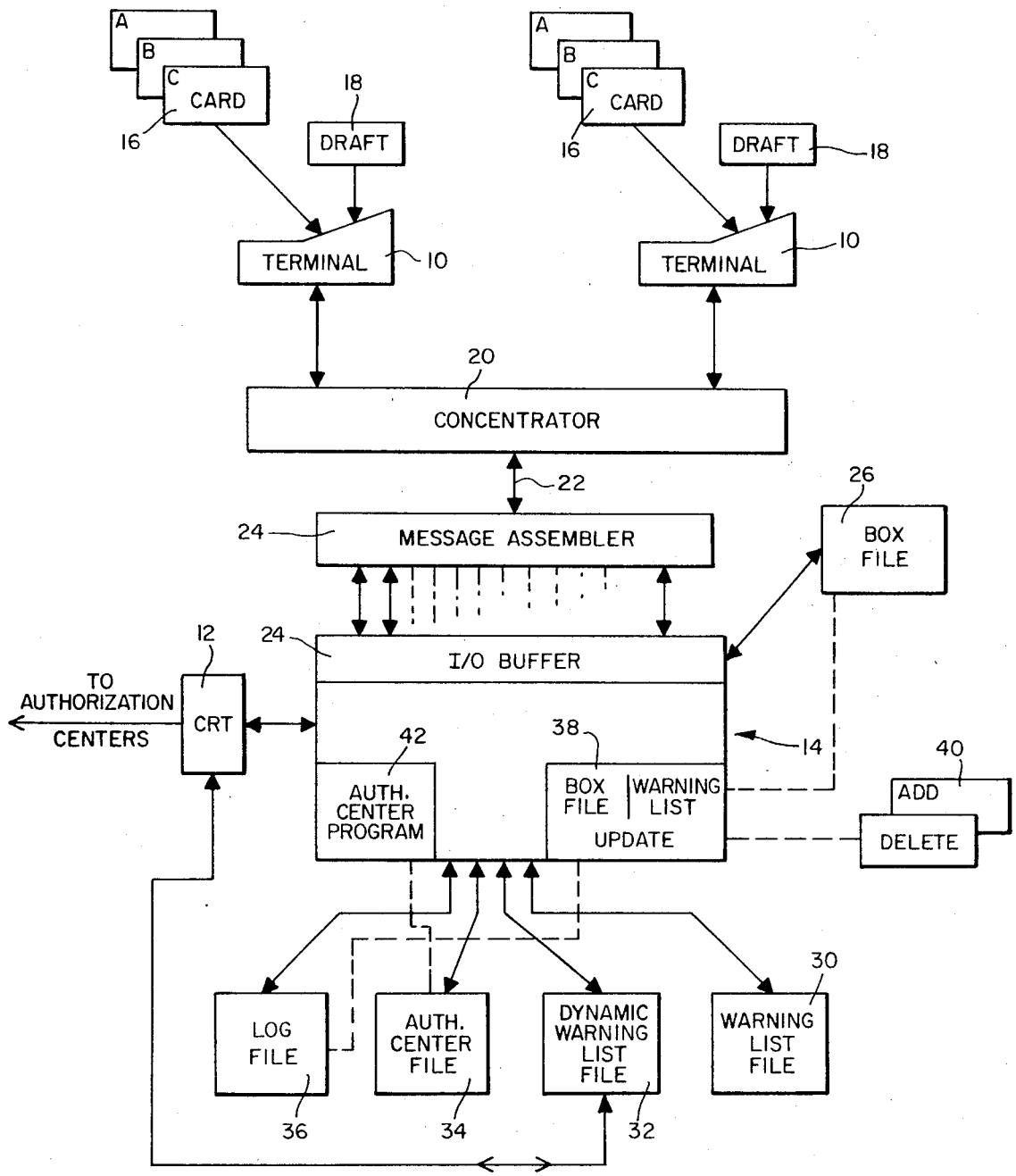
FIG. 1 is a block diagram of the overall system.
Figure 11:
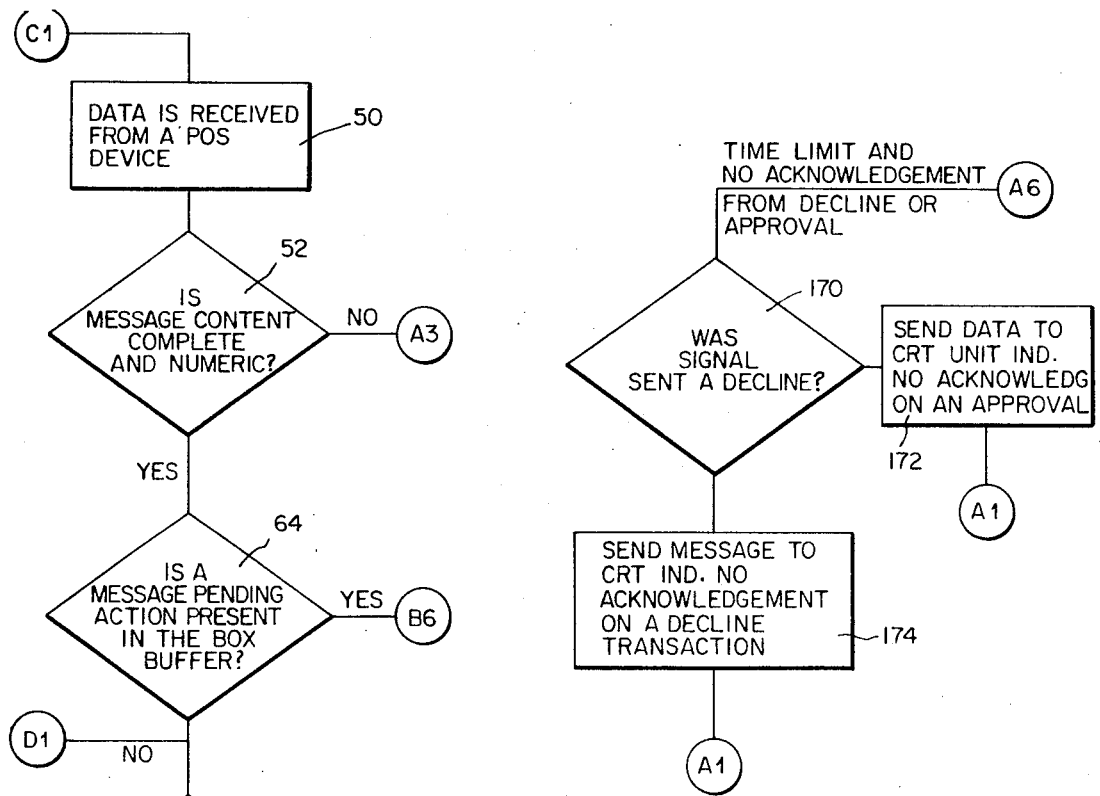
Figure 2:
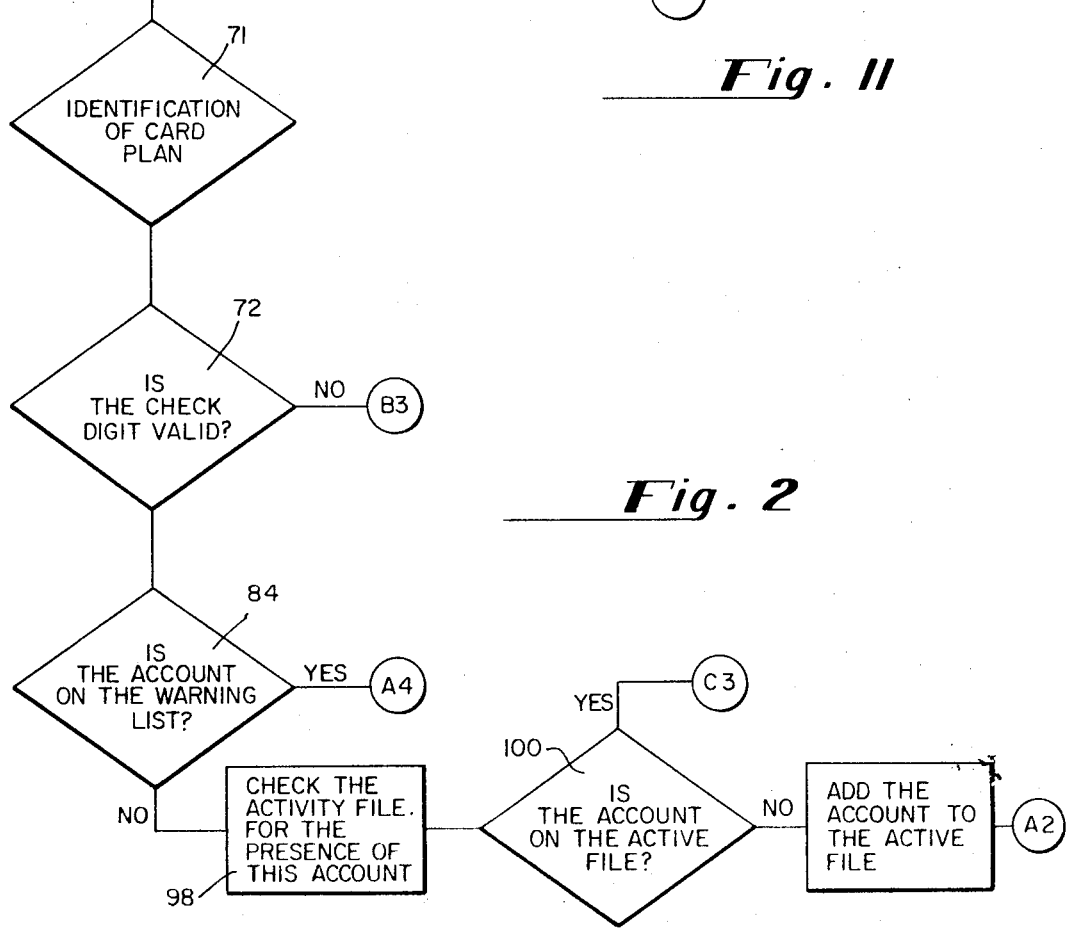
Figure 3:
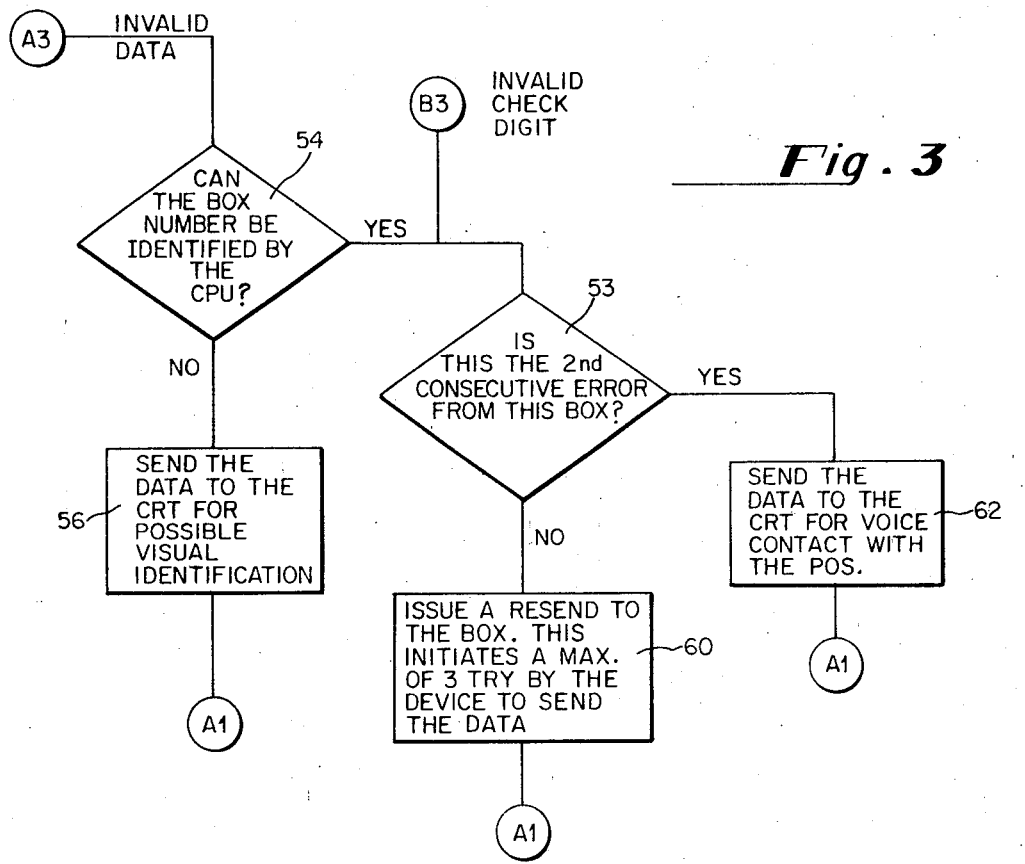
Figure 12:
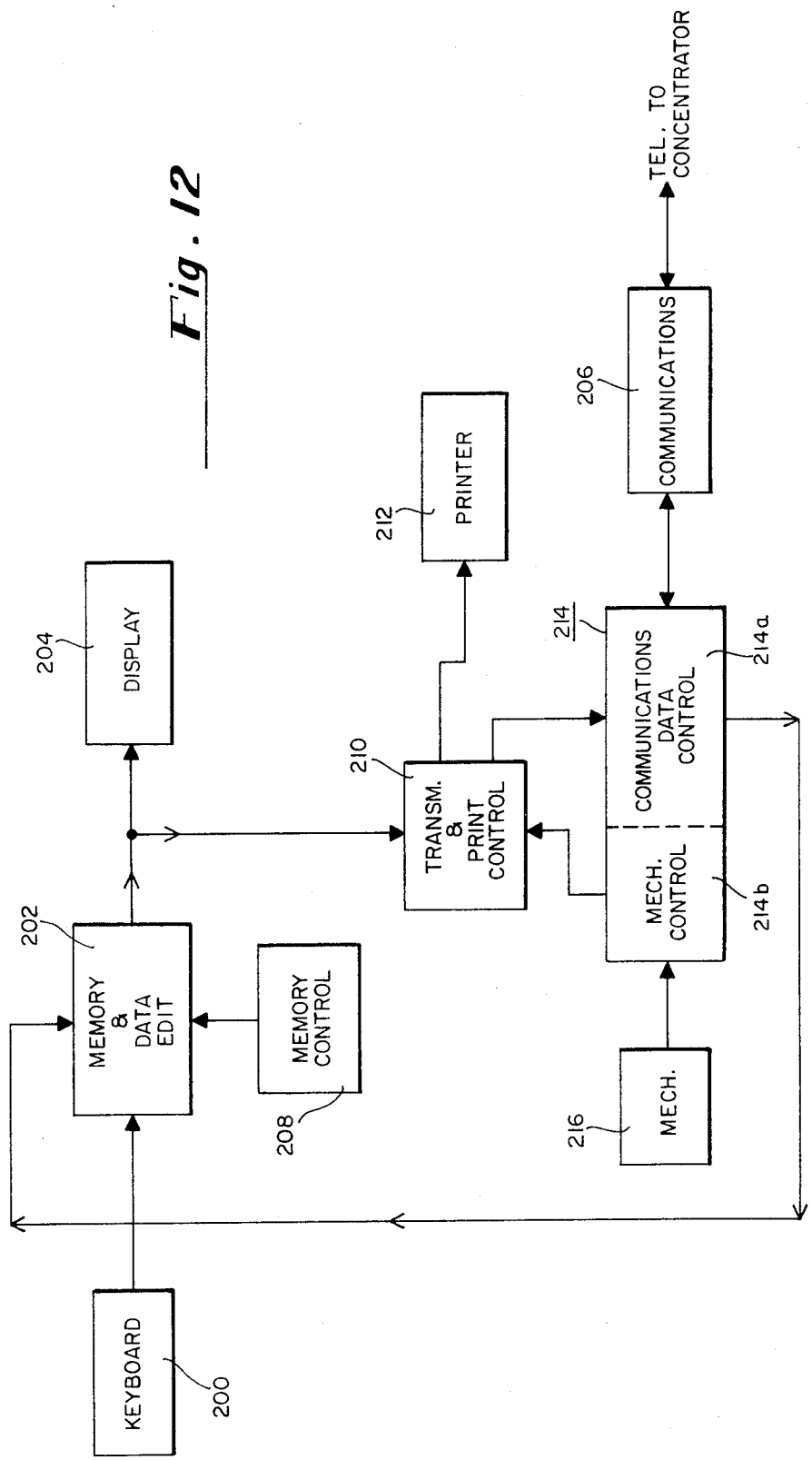
FIG. 12 is a block diagram of a terminal in the system.
Figure 12A:
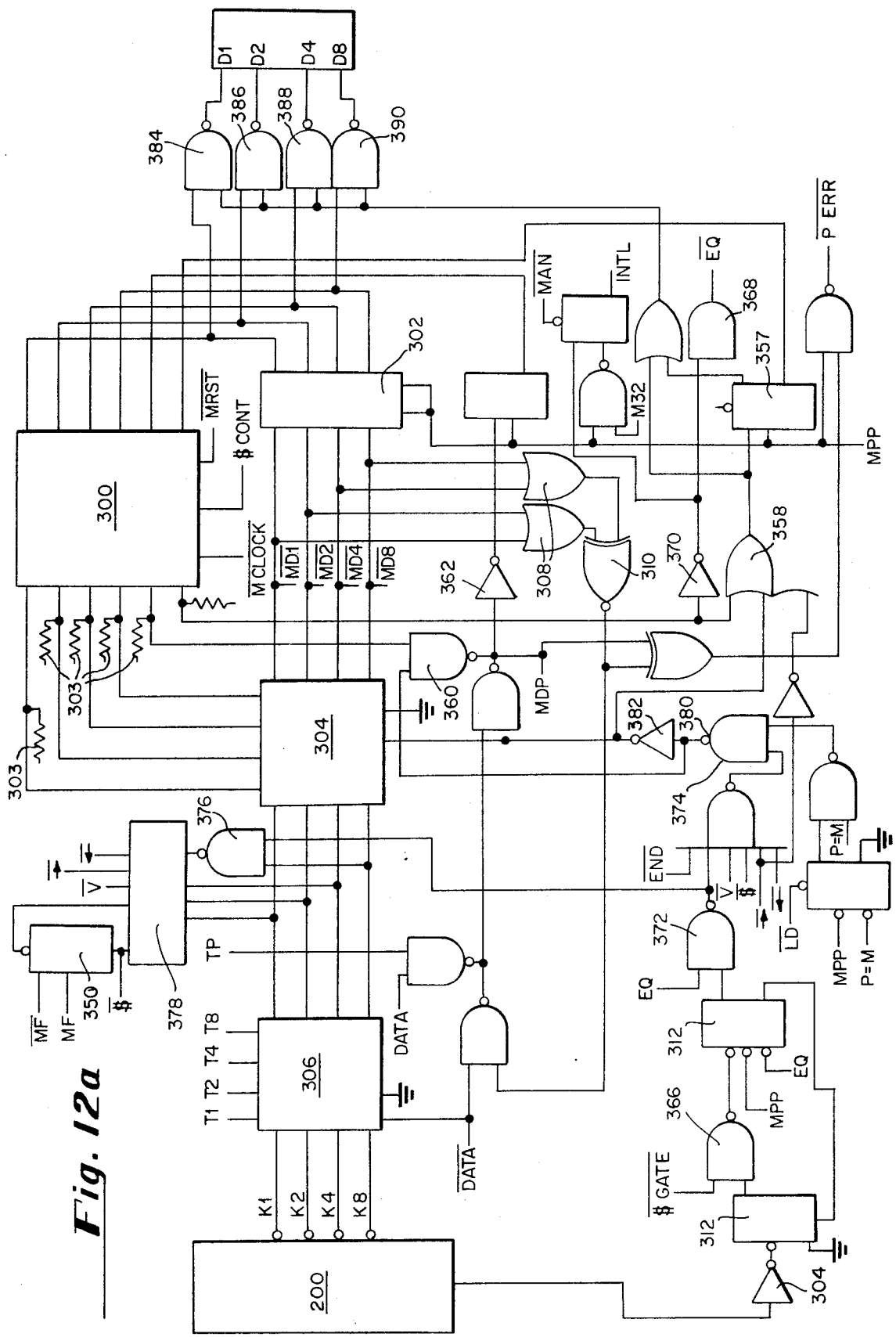
FIG. 12a is a schematic diagram of the circuitry in the terminal memory and data edit section.
Figure 12B:
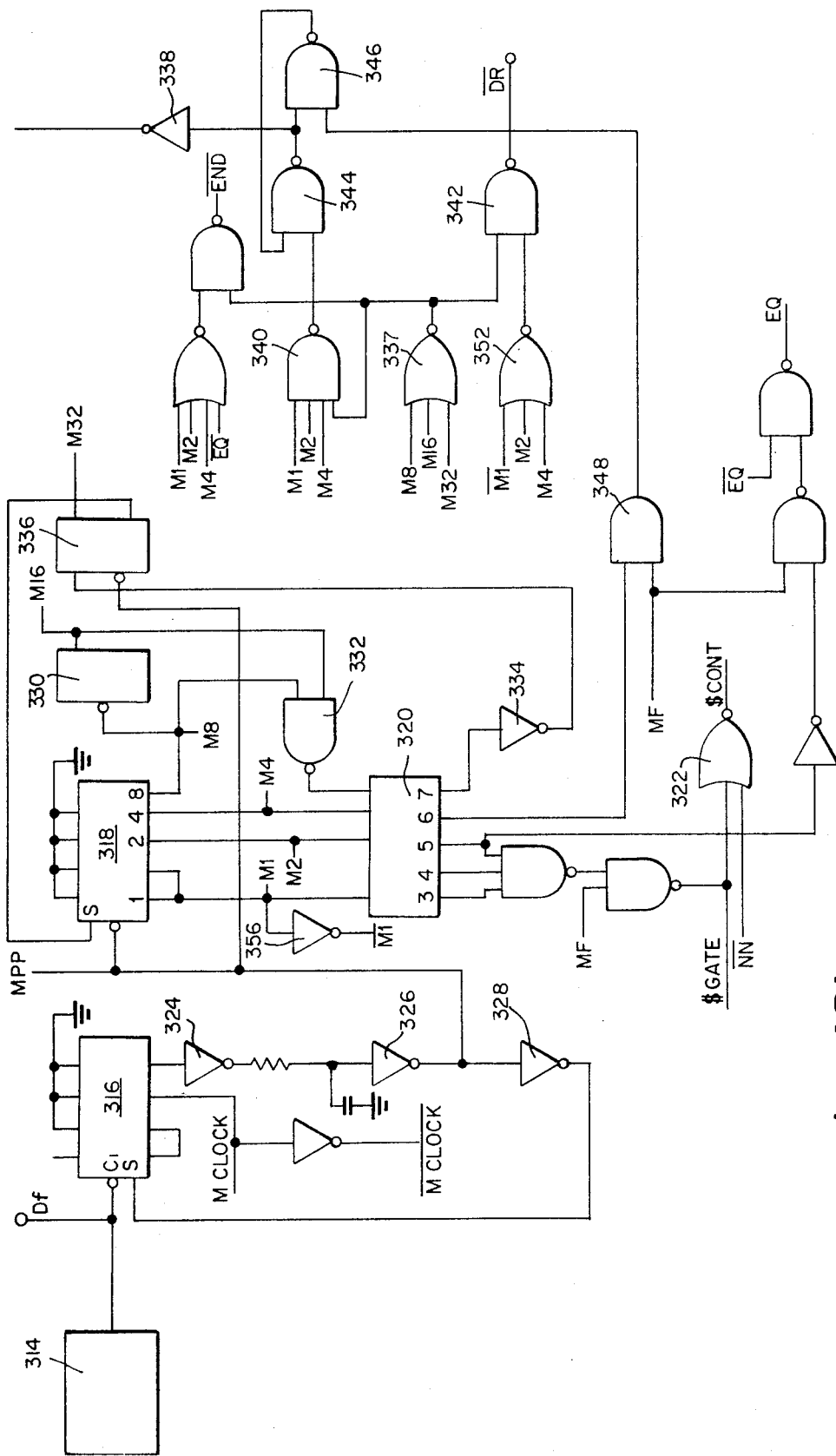
FIG. 12b is a schematic diagram of the circuitry in the terminal memory control section.
Figure 12C:
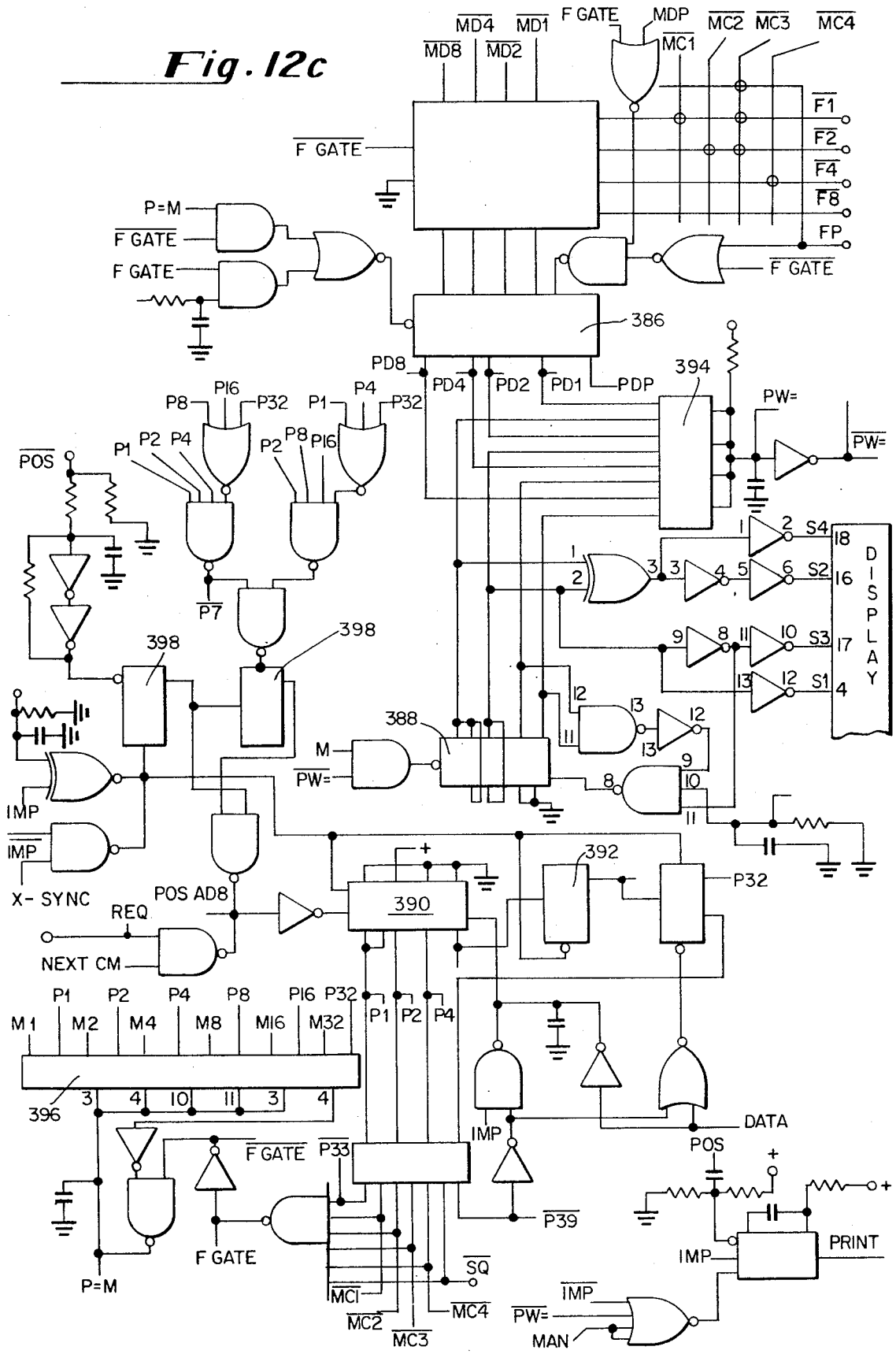
FIG. 12c is a schematic diagram of the circuitry in the terminal transmit and print control section.
Figure 12D:
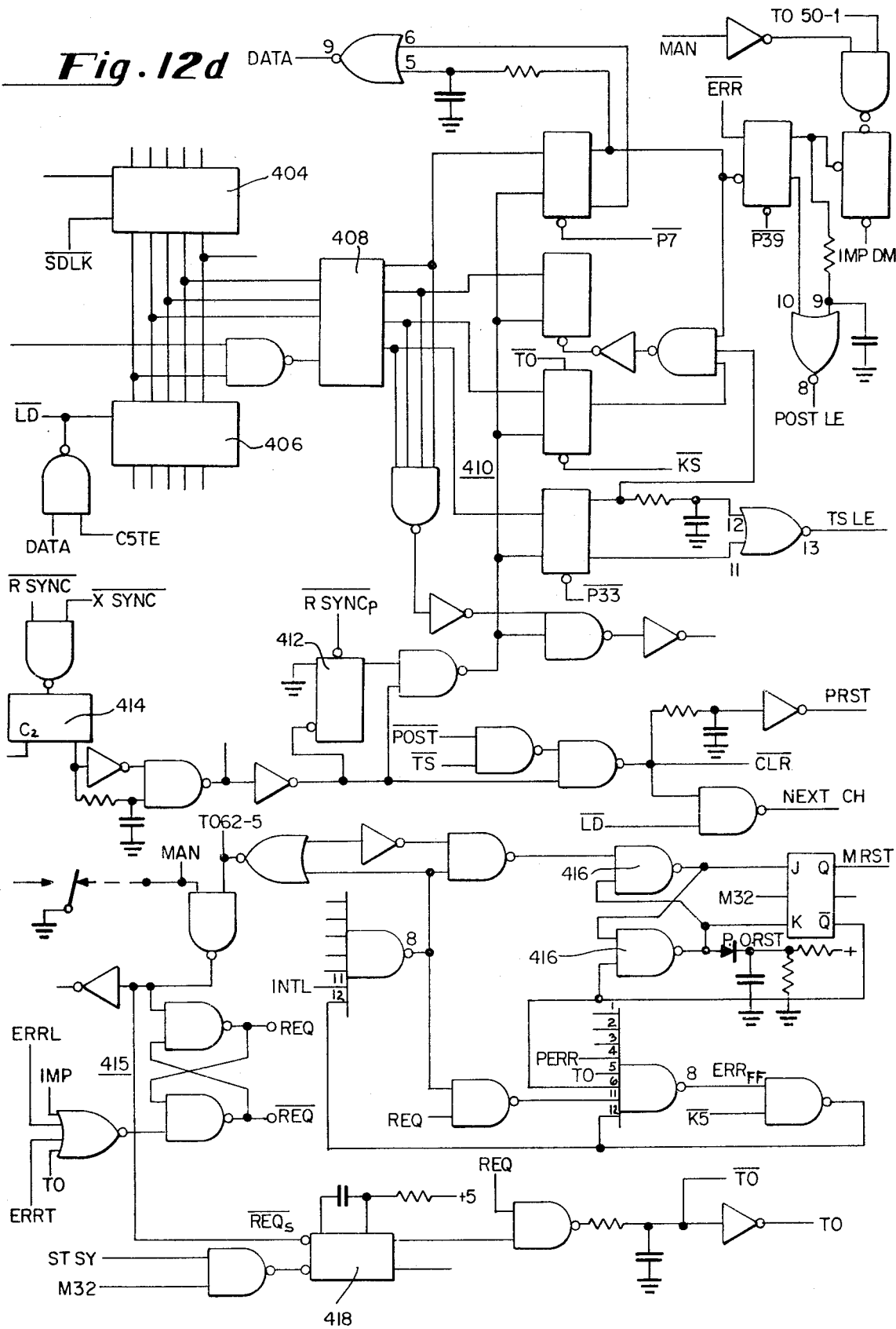
FIG. 12d is a schematic diagram of the circuitry in the terminal data control and mechanics control section.
Figures 13, 18:
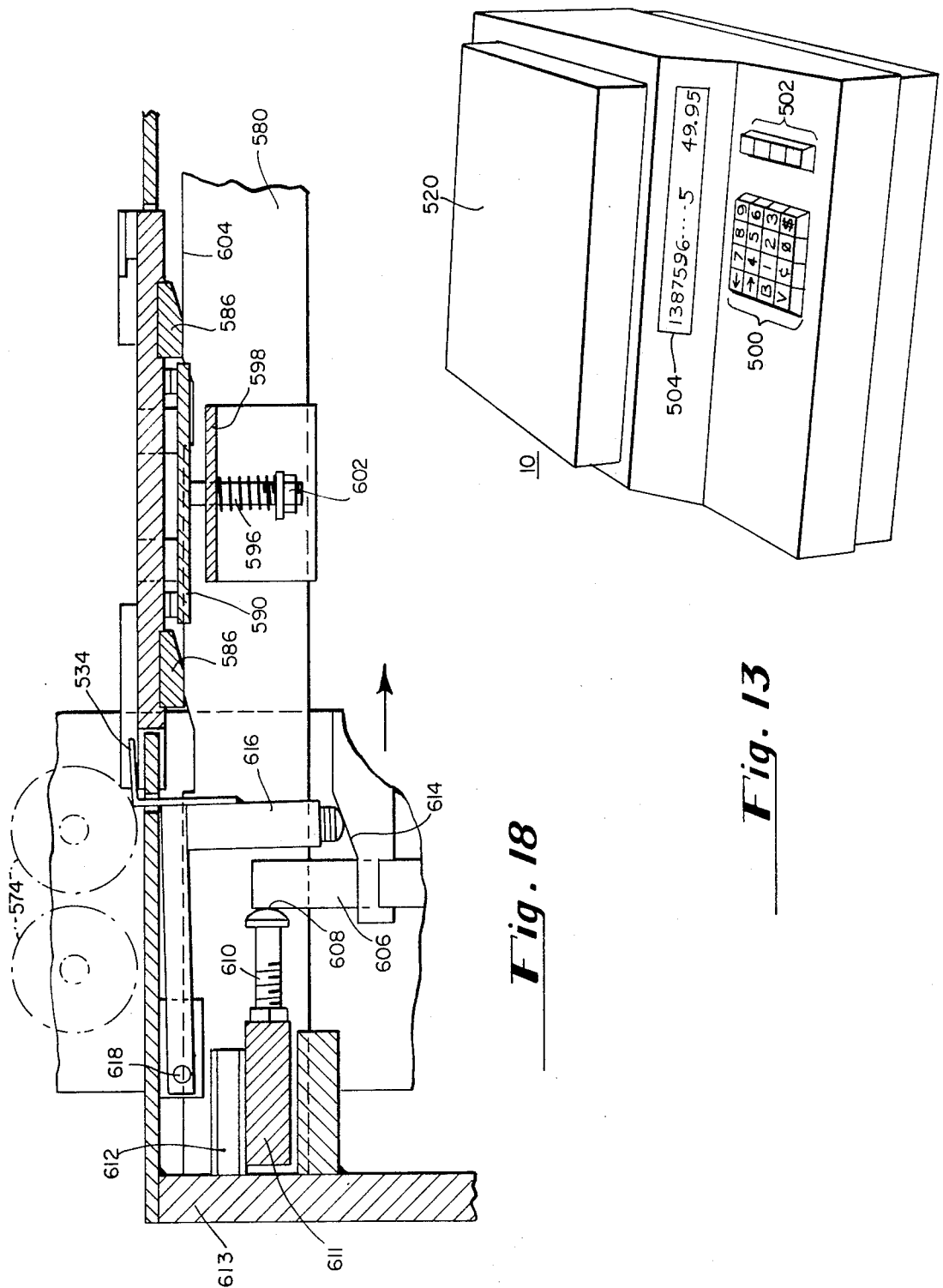
FIG. 13 is a perspective view of the exterior for a system terminal.
FIG. 18 is another view taken along section line 17—17.

The system will be understood from the following detailed description which has been divided into sections which are set forth here for convenience of reference:

1.0 — The Overall System, Block Diagram, FIG. 1
2.0 — On-Line System Processing, Flow Charts, FIGS. 2–11
3.0 — A System Terminal, Block Diagram, FIG. 12
  3.1 — Keyboard, FIG. 12a
  3.2 — Memory and Data Edit Section, FIG. 12a
  3.3 — Memory Control Section, FIG. 12b
  3.4 — Transmit and Print Control Section, FIG. 12c
  3.5 — Communications Data Control and Mechanical Control Section, FIG. 12d
  3.6 — Communications Section,
  3.7 — The Exterior of the Terminal, FIG. 13
  3.8 — The Mechanical Structure of the Terminal, FIGS. 14, 15 and 16
  3.9 — The Mechanical Operation of the Terminal, FIGS. 17, 18, and 19.

Detailed Description of a Preferred Embodiment

1.0 The Overall System

A credit verification system for credit cards representing the preferred embodiment of the invention will first be described with reference to FIG. 1. As shown there, the system comprises the following three functional aspects: transaction entry at point-of-sale terminals 10; a referral function through a video display terminal 12 with voice communication to credit authorization centers external to the system; and a programmed computer function centered at a general purpose computer 14 for system control, normal authorization and record keeping.

Each of the terminals 10 comprises a counter-top data entry device and printer capable of imprinting the data that is embossed on the card holder's card 16 on a transaction or sales draft 18. In addition, the terminal 10 imprints the merchant information from a terminal plate corresponding to the particular terminal 10. In accordance with one very important aspect of the invention, a keyboard is provided for each of the terminals 10 so as to permit the application of the card holder's account numbers and the dollar amount of the transaction or sale on the sales draft 18 in machine readable form. Note that various kinds of credit cards 16 as represented by the letters "a", "b", and "c" are received by the terminals 10 so as to provide a credit verification system for use with various credit plans in accordance with another important aspect of the invention.

The system operation is initiated by clerks at the terminal 10. In this connection, the clerk is instructed to record all credit sales at the terminal regardless of the credit card used by the customer. A clerk uses the terminal 10 by first keying in the account number to agree with the card holder's account number on the embossed plastic credit card 16. Next, the clerk enters the amount of the sales by pressing appropriate keyboard keys. The embossed card 16 and the sales draft 18 are placed into the device and a "verification" button on the keyboard is depressed. The message which is generated at the terminal 10 is now transmitted to the computer 14 through communication means including a concentrator 20, high speed telephone lines 22, and a message assembler 24. It should be appreciated that the single concentrator 20 shown is merely representative of numerous concentrators which may be utilized at various levels.

In accordance with another very important aspect of the invention, each of the terminals 10 may be located at the counters of different merchants. Accordingly, a box file 26 is maintained for storing data relating to each terminal 10 in the system. The box file 26 may be maintained by suitable storage means such as a drum or magnetic tape.

The box file 26 may store data identifying each of the terminals 10 by merchant numbers associated with the terminals and a number for the telephone nearest each of the terminals 10. In addition, the box file 26 includes an accumulator for storing data representing the floor limit for each card plan, a continuing count of the number of approved transactions, and a totaling of the dollar amount of approved transactions at the particular terminal.

Since the service charge for credit verification may very well be distributed on a merchant by merchant basis, the box file 26 provides a particularly convenient means of merchant billing. In this connection, it will be noted that the total volume of approved transaction is contained in the box file as well as the number of approved transactions thereby providing a basis for usage billing. In addition, the information in the box file 26 may be utilized to generate I/O (input/output) buffers for an I/O buffer file 28 of the general purpose computer 14. This is a CPU core resident file having a number of entries corresponding to the number of terminals 10 which contains fixed information relating to the merchants having terminals and variable information regarding the input transaction. The very important functions served by the buffer file is to insure that transaction authorization from the computer 14 to the particular transmitting terminal is received at the time the correct charge card 16 and sales draft 18 are in the terminal 10. For example, if credit verification were requested with respect to a charge card 16–c, it is very important that the particular transaction be authorized at the time charge card 16–c is still in the terminal 10 and not after the charge card 16-b in the next transaction has been inserted into the terminal 10.

The data stored in the I/O buffer file 28 includes identification of the particular terminal 10, floor limit codes indicating the floor limit for each plan (a, b, or c), input messages such as the authorization request from a particular terminal 10, and internal control fields. In addition, the number of the telephone nearest the particular terminal 10 is stored in the buffer file 28. Upon finding the buffer with a pending request, this transaction can be sent to the operator of the visual display means 12 for disposition and a new request may be received by the buffer. The buffer always contains the transaction present in the terminal 10.

The non-fixed field, and the flag fields of the I/O buffer file 28 are used for dynamic storage of information while the on-line program is in operation. The fixed fields, the box number, floor limit codes and the telephone number are inserted during the generate I/O buffer phase when the on-line program commences.

A warning file 30 which may be a drum resident index sequential file is used to store the account number and a flag of those accounts for which a "pick-up card" or a "do not authorize" order has been sent out by the card issuing plan. The flag indicates the type of condition that will cause referral to the video display 12.

In order to increase access speed from the computer 14 to the warning list file 30 and save storage space, the file may be split in two. The first file will contain all account numbers less than 16 characters in length, each of which will require four words of storage. The second file will contain all of the account numbers greater than 15 characters in length, each of which will require 5 words for storage. The data stored in the warning file 30 includes account numbers and flags with corresponding referral codes.

Since the status of certain accounts may change during the on-line program of the computer 14, a dynamic warning file 32 is provided which is also drum resident accessed by the computer 14. This file is created randomly during the on-line program by new adds sent from the operator at the visual display means 12. The file is also accessed randomly from the computer 14. As in the case of the warning list file 30, the dynamic warning list file 32 includes data representing the account number and a flag including a referral code.

In certain instances, it will be necessary for the operator of the visual display means 12 to communicate with another authorization center before approving or disapproving of a transaction. It is therefore important to maintain a drum resident authorization center file 34 which may be accessed by the computer 14. The contents of the file include identification numbers for the authorization centers and corresponding telephone numbers. Finally, a log file 36 is provided to record transactions processed during the on-line program, to update the box file usage and volume counters in the box file update, to provide input data for the box file update. For this purpose, the log file 36 includes data representing counter device identification, the sequence number of a transaction from the terminal 10, an account number, and the amount of the transaction. In addition, the data represents an authorization number assigned by the computer 14 or the authorization center and an action code identifying the type of entry in the log file. The log file may be stored on tape.

The source of information in the various files will now be described briefly. As mentioned previously, the dynamic warning list file 32 is generated by update information obtained from the operator's visual display means 12. As also mentioned previously, the dynamic warning list file 32 permits the maintenance of an up-to-date warning list. Note that the warning list file 30 is not updated during the on-line program. (Broken lines indicates off-line processing.) Instead, the warning list file 30 is generated by a box file warning list update program 38 in response to data from the log file 36, add/delete cards 40 and the box file 26 data. The box file 26 is also updated with the program 38. Similarly, the authorization center file 34 is maintained by means of an off-line authorization center program 42.

When a sales clerk at one of the terminals 10 seeks authorization of a transaction arising out of the use of a particular credit card, a message generated at the terminal 10 is transmitted to the computer 14. The message comprises a start message symbol, a card code identifying a type of card used (credit plan), an account number, a box or terminal number, a sequence number indicating the transaction count for the terminal 10, the amount of the transaction, and an end message symbol. All of this is transmitted to the computer 14.

The on-line program for the computer 14 then accesses the on-line warning list file 30 and the box file 26 to determine the disposition of the request. If it is determined that the request can be approved immediately, that is if the account is not on the warning list and the amount is below the merchant floor limit, an approval message is returned to the transmitting terminal and terminal automatically approves the transaction. The tape log file is then updated with this transaction and the system waits for the next request. However, in certain instances when a referral is needed, a message is sent to the visual display means 12 which may be a uniscope CRT with a code describing the action taken on the account.

The request to the visual display operator may be for anyone of the following reasons:
1. to request authorization of an over-the-limit transaction;
2. notifying the operator of the use of an invalid card;
3. request for retransmission of a message from the counter device; or
4. inform the operator of hardware problems.

The authorization request message which is received by the visual display operator includes a referral code indicating one of the foregoing reasons for the request and a telephone number of an authorization center from the authorization center file 34 or a point of sale device telephone number from the box file 26. The operator of the visual display then communicates with the particular terminal 10 or the dynamic warning list file 32. The communicated message to the terminal 10 will include the authorization number assigned by that authorization center or in the event the transaction is rejected, a reason for rejection. In the latter case, the account number is also included in the message.

2.0 On-Line System Processing

The following account conditions are checked by the system after a transaction is entered at a terminal 10:

1. validity of data entered;
2. status of the account, i.e., on the warning list; and
3. the amount of the transaction is under the floor limit.

In addition, the system provides the following verifications which are made on the transaction:
1. data received, account, box number, sequence, and amount, are verified for numeric content;
2. the issuing plan is identified and the appropriate check digit validation is performed;
3. the status list is scanned for the presence of the account;
4. the card-usage file is checked for over activity;
5. the card plan is checked against the merchant plans accepted and the amount is checked against the floor limit;
6. an approval signal is generated at the computer and transmitted to the terminal; and
7. acknowledgement from the terminal is transmitted to the computer 14 prior to the logging of the transaction.

The data of the transaction is now written in the log file 36 and the card-usage file stored in the computer 14 is updated. If the account was not previously in the card-usage file 14, the account is added. If the card is already in the card-usage file, the number of transactions on this account are updated. The foregoing will now be described more specifically with reference to the flow charts of FIGS. 2–11.

As shown in FIG. 2, the data is received at the central processing unit 14 (50). A check is made to see if the message content is complete and numeric (52). If the answer to this question is in the negative, one of two potential conditions exists. First, the data received is garbled and the box number is invalid. Second, clerical mistakes have been made in the entry of the data at the terminal 10.

As shown in FIG. 3, a check is then made to see if the box number of the terminal can be identified by the central processing unit 14 (54). If the number cannot be identified by the central processing unit 14, the transaction is not processable by the on-line system and the data as it is received is sent to the visual display for operator identification (56). If the visual display operator can identify the terminal 10, voice contact may be initiated with an appropriate request for reinitiating the transaction authorization request.

If the data received includes invalid data in the amount or account field of the message, a resend signal may be transmitted from the central processing unit 14 to the terminal 10. If only one error has been received from the terminal 10 (58), a resend signal is transmitted to the terminal (60). In the event that two consecutive errors have been received from terminal 10, the data is set to the visual display 12 initiating voice contact between the visual display operator and the terminal (62).

Figure 4:
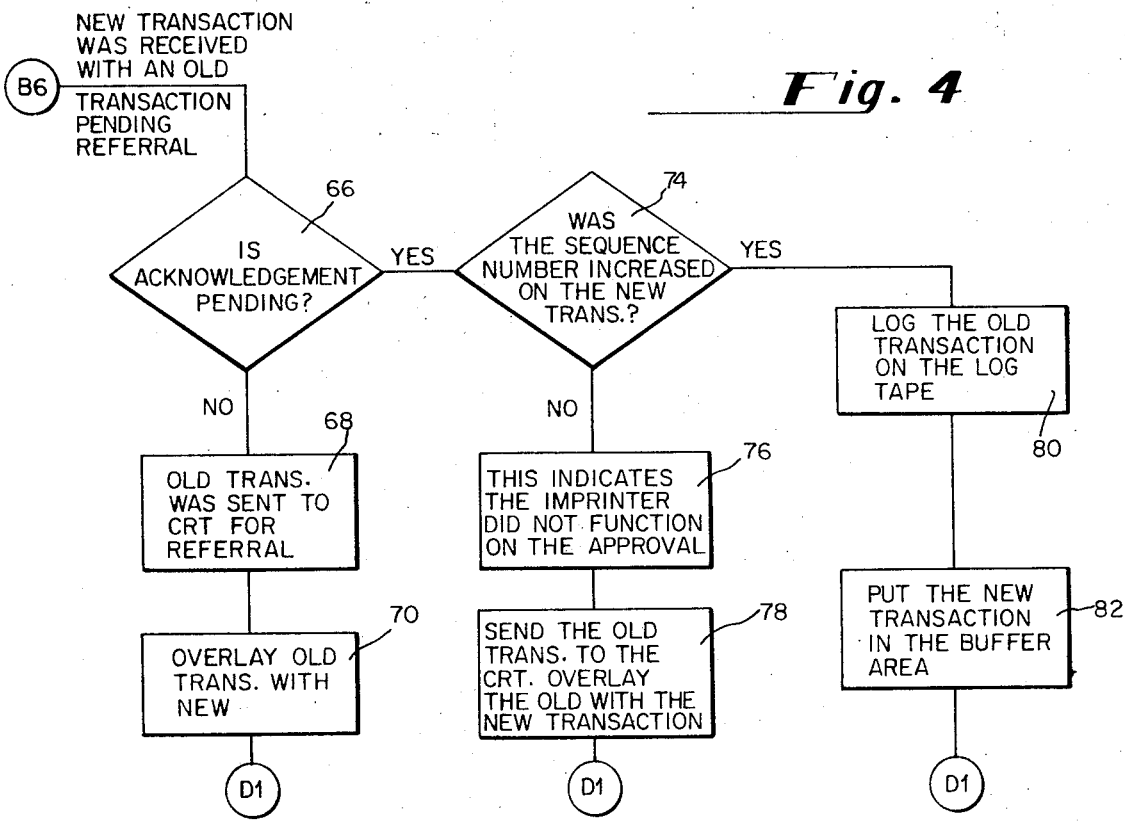

Referring again to FIG. 2, if the message content is complete and numeric, a determination is made as to whether a message transmitted from the requesting terminal is pending in the I/O buffer file 28 (64). If a new transaction was received with an old transaction pending as shown in FIG. 4, a determination is made as to whether acknowledgement is pending (66). If an acknowledgement is not pending, this means that the old transaction was sent to the visual display 12 for referral (68) and the new transaction is overlaid with the old transaction (70). If an acknowledgement is pending for the old transaction, a determination is made as to whether the sequence number increased on the new transaction (74). If the sequence number did not increase, this indicates that the carriage at the terminal 10 did not function on the approval from the central processing unit 14 and the old transaction is then sent to the visual display 12 and overlaid with the new transaction (78). If the sequence number did increase, the old transaction is logged in the log file 36 (80) and the new transaction is placed in the I/O buffer 28 (82).

The transaction is now ready for identification of the account number and the issuing credit card plan (71) as shown in FIG. 2. Once the account and issuing plan have been identified, the transaction is ready for a number of checks. First, a check digit validation (72) is performed. If the check digit test fails, a resend signal is returned to the terminal 10 (60). After two resends have been sent to the terminal 10, the transaction is sent to a visual display 12.

The next check determines whether the account is on the warning list (84) as shown in FIG. 2. If the account is on the warning list (86) as shown in FIG. 5, the status of the account must be determined (88). If the account is statused for referral to the visual display 12, a standby signal is transmitted to the terminal 10 (90) and the central processing unit 14 is ready to process other entries from the terminal (92). If the account is statused as a "hot card", a message is transmitted to the visual display 12 indicating the account is on the "hot card" list (94). Again, a standby signal is transmitted to the terminal 10 indicating the central processing unit 14 is ready to process the next transaction entry for that particular terminal (96).

In the event that the account is statused for referral to the visual display, the visual display operator will call the authorization center of the appropriate card plan. Upon receipt of authorization, the operator enters the transaction through the visual display 12 with a decline or an authorization number indicating approval. This data is then transmitted to the terminal 10. When an authorization is transmitted, a transaction is entered in the log file 36 after acknowledgement from the terminal 10 to the CPU 14.

If the account is not on the warning list, a check in the activity file is made for the presence of the account (98) as shown in FIG. 2. If the account is on the active file (100), a determination must be made whether the activity is beyond the prescribed 24 hour limit (102) as shown in FIG. 6. If the activity is not beyond this limit, a one is added to the activity counter for this account (104), and data is written back to the active file (106). If the activity is beyond the prescribed 24 hour limit, a standby signal is transmitted to the termianl 10 (108) and the transaction is referred to the visual display 12 (110).

Figure 8:
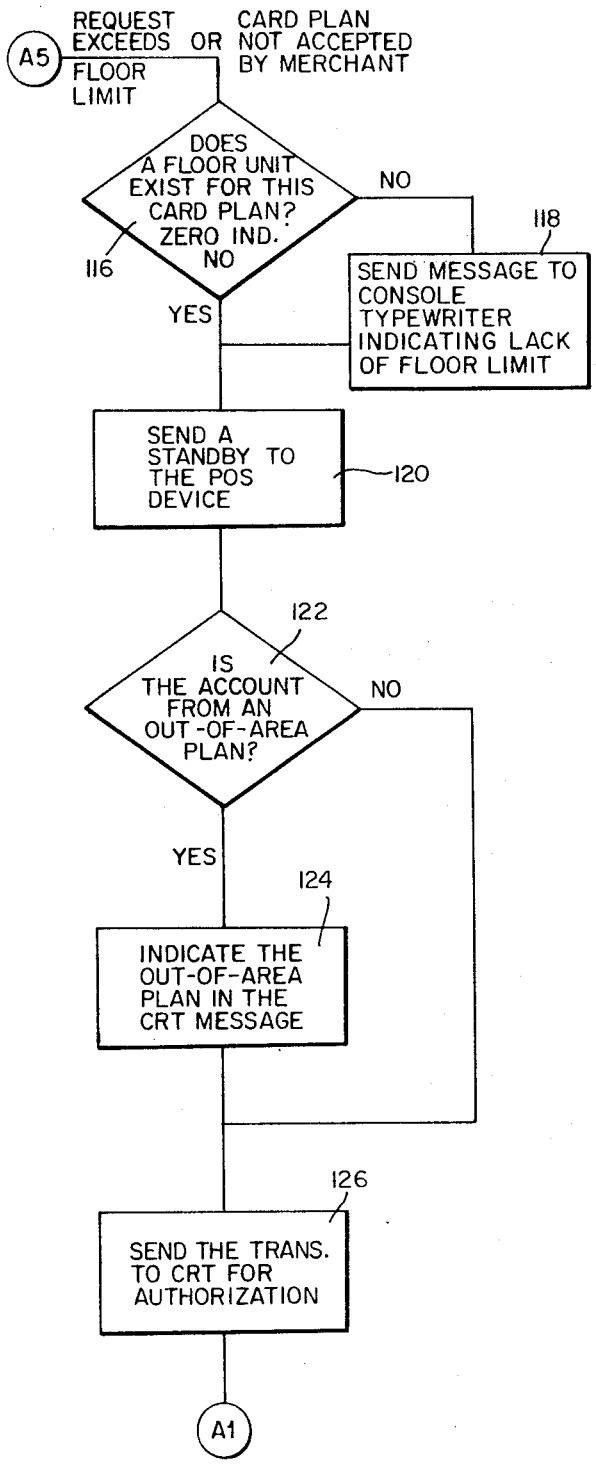
Figure 9:
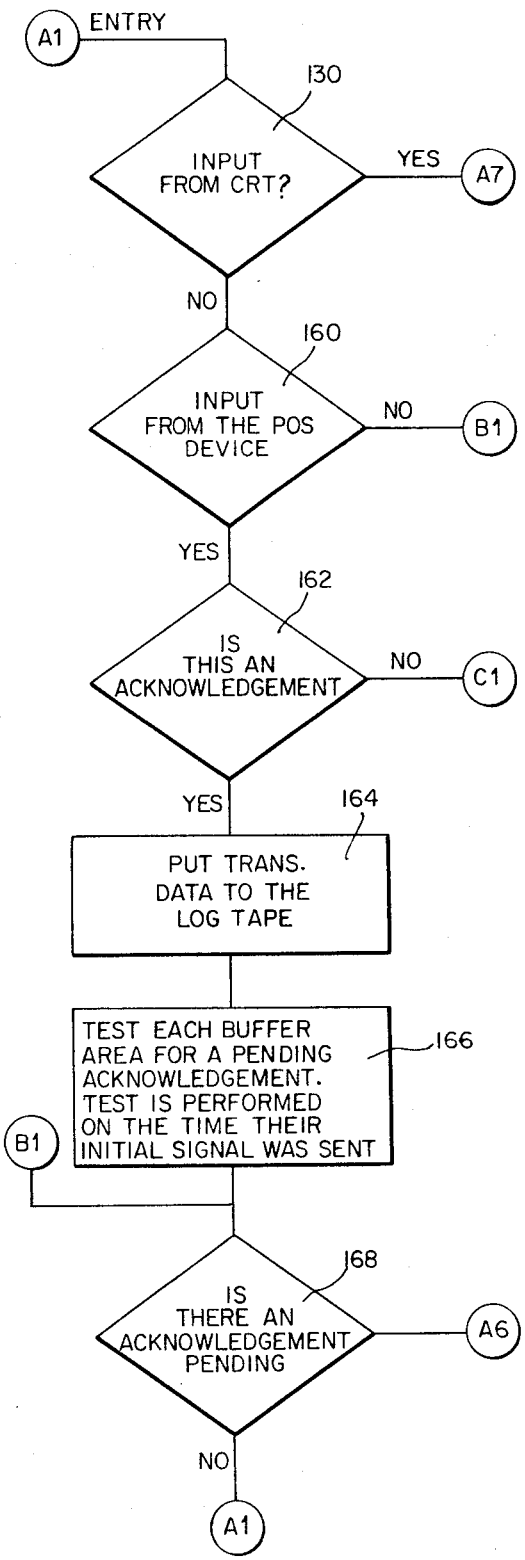
Figure 10:
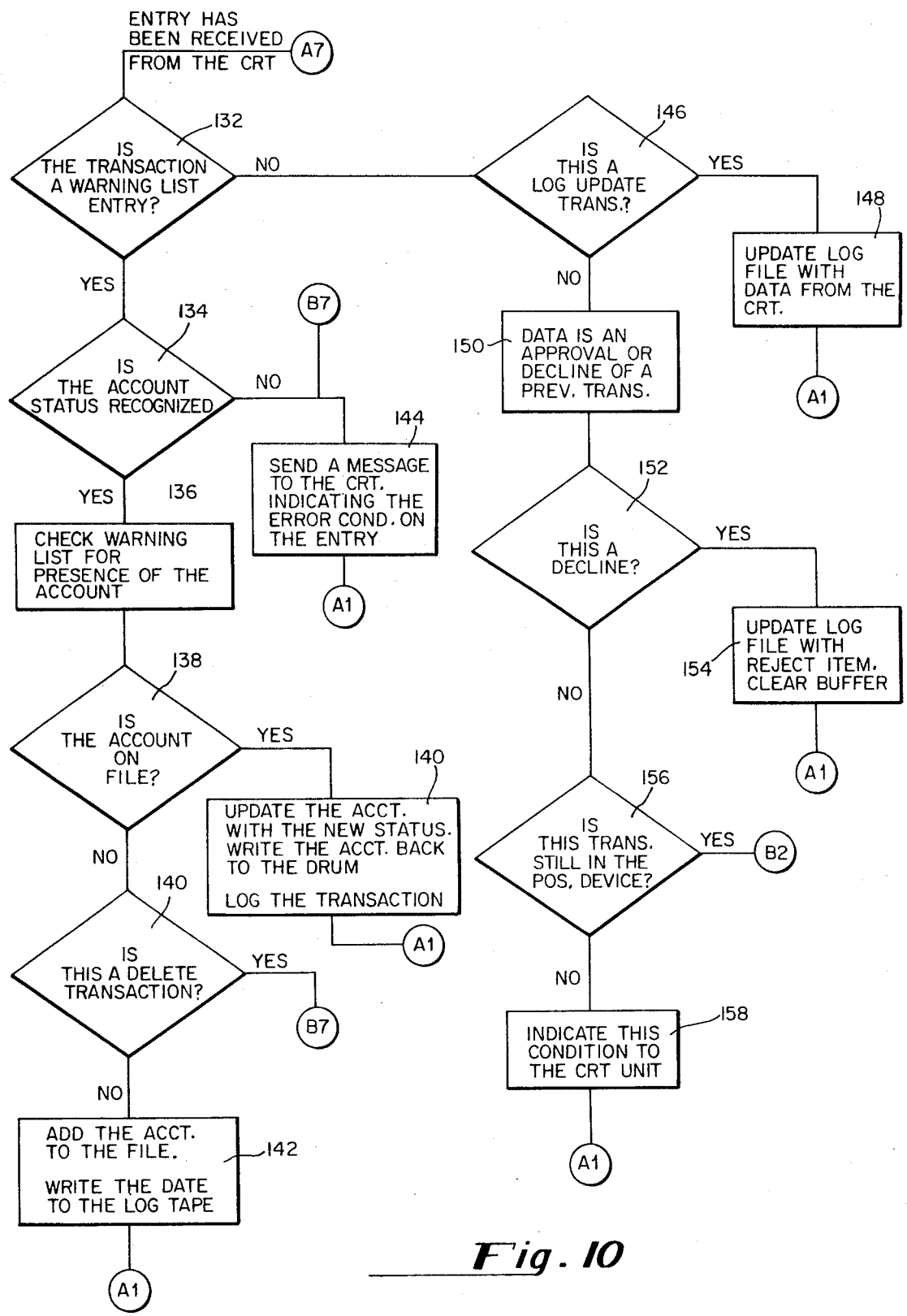

If the activity on the account is not beyond prescribed 24 hour limit, a determination is now made regarding the acceptability of card plan by the merchant having the requesting terminal (112) as shown in FIG. 7. If the card plan is accepted by the merchant, a determination is made as to whether or not the transaction authorization requirements for a substantial number of cards in a given credit card plan for a given terminal are satisfied, i.e., does the amount exceeds the floor limit for the particular card plan(s) the merchant accepts (114). Note that the transaction authorization requirements are not a function of the card but only the terminal involved in a transaction If the merchant does not accept the particular card plan or a floor limit does not exist for that particular card plan in the particular merchant, referral is made to the visual display 12 as shown in FIG. 8. Before referral, a determination is made as to the existence of a floor limit for the particular card plan (116). If no floor limit exists, a message so indicating is sent to a console typewriter (118). In any event, the standby signal is transmitted to the requesting terminal 10 (120). A determination is also made whether the account is part of a out-of-area plan (122). If the account is from out-of-area plan, the out-of-area plan indicated in a message to the visual display 12 (124). The entire transaction is now referred to the visual display 12 for authorization (126). Referring again to FIG. 7, in the event that the card plan is accepted by the merchant and the transaction does not exceed the floor limit set by that merchant for that particular card plan, approval of the transaction is transmitted to the terminal (128).

For each entry of data into the central processing unit 14, a determination is initially made as to whether the input is from the video display 12. If the answer is yes, further determinations are made. First, a determination is made as to whether the entry is to update the warning list. If it is for warnin list update, a determination must be made whether the account status is recognized (134). If it is recognized, the warning list is checked for the presence of the account (136) to determine if the account is on file (138). If the account is on file, the account is updated with a new status and the transaction is logged (140).

If the account is not on file, the determination is made whether to delete the transaction (140). If the answer is yes, then the transaction is deleted. Otherwise, the account is added to the file and the date is written in the log file (142).

In the event that the account status is not recognized, the message is sent to the visual display 12 indicating the error conditioned on the entry (144). If the transaction is not a warning list entry, the determination is then made as to whether or not the entry is a logged update transaction (146). If it is, the log file is updated with the data from the display 12 (148). If the entry is not a log update transaction, the data is an approval or decline of a previous transaction (150). It must then be determined if the data is a decline of a previous transaction (152). The log file will be updated with a decline or reject and the buffer will be cleared (154). If the data is an approval of a previous transaction, a determination is made as to whether the transaction is still in the particular terminal 10 (156). If it is not in the particular terminal 10, this condition is indicated through the display 12 (158).

The foregoing assumes that the entry was an input from the display 12 (130). If it is not, a determination is made as to whether the entry was an input from the particular point-of-sale terminal 10 (160). If it is, a determination must then be made if this is an acknowledgement (162). If it is an acknowledgement, the transaction data is input to the log tape (164) and each buffer area is tested for a pending acknowledgement. The test is performed at the time the initial signal was sent (166).

A determination is now made as to whether there is an acknowledgement pending (168). When a predetermined period of time has elapsed and there is no acknowledgement from a decline or an approval, a determination is made as to whether the signal sent was a decline (170). If the signal was not a decline and it was therefore an approval, the data is sent to the visual display indicating signal acknowledgement on an approval (172). Similarly, a signal is sent to the visual display 12 indicating the acknowledgement of decline transaction (174).

3.0 The System Terminals

Referring now to FIG. 12, each terminal 10 is provided with a keyboard 200 which is used by a clerk to enter the account number and the dollar amount of the transaction into the terminal. As will be further described with reference to FIG. 13, the keyboard 200 comprises 16 keys 500 arranged in a 4 × 4 matrix. The keyboard also comprises 4 indicator lights 502 which are used to communicate the response of the system to the request for credit verification.

Each terminal 10 also includes a memory and data edit section 202. When the clerk keys in an account number and the amount of the transaction, both dollar and cents, all of this data is stored in this section. The data editing that is performed is basically field control for the three separate fields: the account number field; the dollar amount field; and the cents amount field. The memory and data edit section 202 also inserts a parity for each character keyed in.

A display section 204 displays all data which is keyed into the memory on a display panel 504 is shown in FIG. 13 to provide a visual check on the keyed in data for the clerk. Although various display panels may be utilized, the Burroughs self scanning display panel, model no. is particularly suitable. In addition to the keyed in data, any data this is entered into memory in the terminal via a communication section 206 is also displayed here.

A memory control section 208 provides the timing and control signals for the memory and data edit section 202. Another control function is provided by the transmission and print control section 210. As the data is stripped off the memory in the data and memory section 202, the transmission and print control section 210 either directs the data to a printer section 212 or to the communications section 206 which converts the data to a suitable form for transmission over the high speed telephone lines 22.

The printer 212 is, for the most part, a mechanical structure which will be described in substantial detail with reference to FIGS. 14–19. At this juncture, it is important to note that the printer provides a machine readable transaction draft in accordance with one very important aspect of the invention. The data which is actually printed on the draft may include the account number, the amount of the transaction and an authorization number from the central processing unit 14.

A communications data control and mechanical control section 214 is also provided. A communications data control portion 214a edits the data, decodes the instructions to be performed, such as, when to transmit data, when to switch the circuitry for receiving data, and deciphers the standby messages, the valid messages, and the error messages. A mechanical control portion 214b controls all of the interfaces with a mechanical section 216. It receives signals representing such things as print position, and the interlocking of the doors, credit cards, and forms. The control portion 214b also controls the motion of the terminal carriage itself which is part of the mechanical section 216. The carriage and other aspects of the mechanical section 216 will be described in substantial detail subsequently with reference to FIGS. 14-19.

A typical transaction at the terminal 10 will now be described with reference to the various sections of the terminal. A clerk keys in the transaction data on the keyboard 200 which includes the account number which may be up to 18 or 19 characters, a dollar amount which may be up to four characters or 9,999 dollars, and the cents amount which consists of two characters. This data is then applied to the memory and data edit section 202 and is displayed on a display panel 204. Upon depressing a keyboard verification button V as shown in FIG. 13, the data is transmitted via the transmission and print control section 210, the communications data control portion 214a and the communications section 206 to the central processing unit 14.

A response is now received from the central processing unit which may include as many as seven characters representing an authorization number and/or a date code. This data is transmitted via the communication section 206 and the communications data control portion 214a to the memory and data edit section 202. In addition to the authorization number and/or the date code, a one character instruction is transmitted for initiating movement of the carriage. An acknowledgement is now transmitted from the terminal which consists of the first five characters of data followed by activation of the mechanical section 216 in response to signals from the mechanical control portion 214b. As will be described in further detail with reference to FIGS. 14-19, the mechanical control portion 214b directs the movement of a carriage 506 to initiate movement and directs the transmit of print control section to start setting up the printer 212 for the first character in memory.

Figure 14:
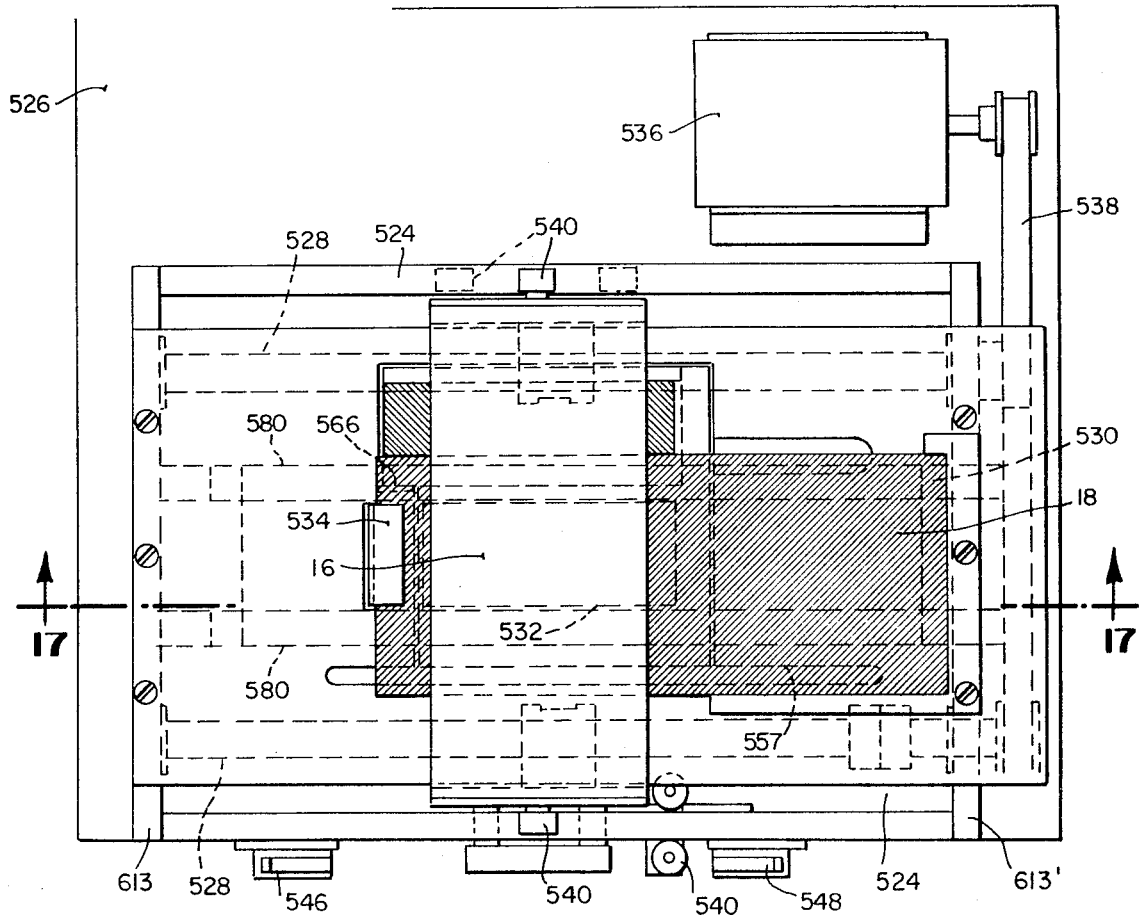
FIG. 14 is a top plan view of the interior of a system terminal.

As the carriage 506 continues moving, the mechanical section 216 sends signals to the mechanical control section 214b which in turn directs the transmit and print control section 210 to set up the printer 212 for successive characters coming out of memory. Each time a printable position of a print wheel 508 shown in FIGS. 16 and 17 is passed, a hammer strikes against the print wheel 508 so as to print the appropriate character on the bottom portion of a transaction draft or slip 510. At the same time that this data is being printed on the bottom of the sales slip 510, an imprint of the data carried by a credit card 16 and a merchant terminal plate 512 is being made on the draft 18 as shown in FIG. 14. Upon completion of the forward motion carriage 506, a memory section 202 is cleared and the carriage 506 is reversed returning to the home position. The terminal 10 is now ready for the next transaction.

3.1 Keyboard

As shown in FIG. 12a, the keyboard 200 comprises four output lines K1, K2, K4, and K8 which carry data signals in binary format. When the zero (0) key of the matrix 500 as shown in FIG. 13 is depressed, all of the lines $K_1$, $K_2$, $K_4$ and $K_8$ are in the low state. When the key 9 is depressed, the lines K1 and K8 are in the high state. Another output line KS carries a data strobe signal. This line is in the high state each time a key is depressed.

3.2 Memory and Data Edit Section

This section comprises a multichannel recirculating memory path comprising a 32 bit delay shift register 300, a one bit delay element 302, and a transfer gate 304. The various input channels to the register 300 are suitably biased through the use of resistors 303. The data enters four transaction data channels and one control channel of the recirculating path at the transfer gates 302 so that the gate 302 in effect functions as a window. Another transfer gate 306 is provided for switching data into the path from the keyboard 200 or the communication section 206. The recirculating memory path may be accessed at the output of the delay element 302 for the display in the section 204. Since the memory comprises the 32 delay bits of the register 300 as well as the single bit of the element 302, the total memory recirculation time or storage capacity is 33 or n bits long.

The terminal 10 is provided with means for entering the account number and the cents amount of the transaction as a left justified field while entering the dollar amount as a right justified field. This is accomplished as follows.

The recirculating memory is n or 33 bits long in the four transaction data channels as well as the control channel which controls the entry of transaction data at the window. When the terminal 10 initiates the credit check, position 7 of the control channel has a "1" while all other positions have a "0" including position 8. In accordance with the mode of operation for the recirculating memory path, data is always entered in the last position of the memory which has a "1" in the control channel. This results in entry of data into the data channels at position 7 since the last "1" at position 7 in the control channel location indicates a condition for receipt of data in position 7. When data is entered in position 7, a one is automatically entered in position 8 of the control channel. After the next cycle of the memory, the data is entered in position 8 of the data channels and position 9 of the control channel receives a "1".

This procedure is utilized when entering the account number for the transaction which is displayed as a left justified field. When the account number has been completely entered in the recirculating memory, the recirculating memory is now ready for entry of the right justified dollar amount field.

First, positions 7-28 of the control channel are filled with 1's. This means that the first character of the dollar amount can only be entered in position 28 in accordance with the mode of operation for the recirculating memory since data is only entered in the last position having a "1" in the control channel. Simultaneously, a "1" is entered in the control channel at position 29. By short circuiting the delay element 302 when position 25 should be in the window, the first character of the dollar amount is effectively shifted from position 28 to position 27 and the second character is entered in the same position 28 since the "1" of position 29 is shifted to position 28. Simultaneously, a control bit "1" is again entered in position 29. Similarly, the delay element 302 may be again short circuited when the time slot 25 should again be in the window to enter another dollar character in the time slot 28 and shift the other dollar character to time slots 26 and 27. This is repeated until time slots 25–28 are filled or the right justified dollar field is completed.

The data can now be entered in the cents field. The cents field like the account number field is a left justified field. Accordingly, the cents field characters are entered in the recirculating memory without short circuiting the delay element 302.

In the circuitry disclosed, the short circuiting of the delay element is actually achieved by an internal recirculation path of the register 300 which is controlled by the dollar control signal applied at a control pin RC. The window is actually located at the lines MD-1, MD-2, MD-4 and MD-8.

The memory section 202 also includes parity generation and detection gate 308 and 310. The data editing portion of the memory section 202 comprises flip-flops 312 and 314 in associated gating network. The flip-flops function to insert the characters in the proper field of the memory 202 and lock out the keyboard when the field is filled. The data editing portion also controls the data that goes out to the display section 204 by blanking out the data up to the position where the last character was inserted. The data editing permits reentry of the data at particular locations in the memory without erasing other locations in the memory and without effecting display of that data. In this connection, forward spacing and backward spacing keys are provided in the matrix 500 as shown in FIG. 13.

3.3 Memory Control Section

Fundamentally, this section is a counter for determining the position of the recirculating memory. The counter comprises a free running multivibrator 314, a divide-by-7 counter 316 cascaded with a divide-by-33 counter including an element 318. This section also includes coding logic 320 with associated gating circuitry for controlling the fields of these recirculating memories. In this connection, this section generates a $CONT signal at a gate 322 for establishing a right justified dollar field in the recirculating memory.

The interaction of the memory data edit section 202 and the memory control section 208 will now be described in some detail. When the power is turned on, the free running multi-vibrator 314 begins to generate a pulse which is divided-by-7 at the counter 316. At the end of each count of 7, a strobe reset signal is generated via inverters 324, 326, and 328 which starts the counter 306 back to the zero position. At the same time, the counter element 318 is advanced by a count of 1 and an MPP signal is generated which clocks the delay element 302.

The element 318 continues counting every 7th pulse until it receives eight clock pulses. At that time, it generates an M8 carry pulse which toggles a memory reset flip-flop 330 and resets the counter to zero. After each of two more series of eight pulses, the counter 330 is toggled again. After still eight more clock pulses with the flip-flop 330 being set and the counter 318 generating the M8 pulse, a gate 332 is satisfied and enables the decoder 320 to generate an output which corresponds to a count of 32. At this time, an invertor 334 allows a flip-flop 336 to be set which generates the M32 pulse signifying character position 32. This occurs once every recirculation of the memory.

Simultaneously, a control signal $\overline{7 + 7 \text{ to } 26}$ is generated as the output of an inverter 338. This last mentioned signal is generated in the following manner. A gate 337 is enabled when inputs M8, M16, and M32 are low. These signals are obtained at the output of the counter element 318, the flip-flop 330, and the flip-flop 336. When this output goes high, gates 340 and 342 are enabled. Note that the gate 340 requires three additional signals M1, M2, and M4. These signals are obtained as the output of the counter element 318.

When M1, M2, and M4 are high and M8, M16 and M32 are low, this corresponds to a count of 7. This count is obtained when the output of the gate 344 is high. However, the flip-flop consisting of the gate 344 and the gate 346 will not set because the output of the gate 348 is low at this time. The reason the output of the gate 348 is low is because the MF signal which is generated by a flip-flop 350, the money field flip-flop, has not been set and the MF signal is low.

The other signal that is generated by the gating logic previously mentioned comprising the element 342 is the display reset signal. This display reset signal will be generated when the output of a gate 352 goes high. It will go high when the M1 signal is low, the M2 signal is low, and the M4 signal is low. The M1 signal is generated via an invertor 356. At the time corresponding to recirculating memory position 1, the gate 342 will be satisifed and the display is reset.

The previously mentioned signal $\overline{7 + 7 \text{ to } 26}$ resets the flip-flop 357. After the flip-flop 357 is reset, a single control bit is inserted in position 7 of the control channel. At the end of the reset time, the M reset or RSD signal will return to the high state and the memory will recirculate with all of the positions being blank except for the single bit in the control channel at position 7.

This and other control bits recirculate out of the register 300, to a gate 358, to the flip-flop 357 and back into the register 300. A parity recirculation path is provided via a gate 360, an invertor 362, and back into the recirculating memory path at the storage element 302.

The entry of data into the recirculating memory path will now be described. Initially, the clerk will enter the account number on the keyboard 200. For purposes of illustration, assume that the first character or digit of that number is 6. Upon depressing the key 6 in the matrix 500 as shown in FIG. 13, lines K2, K4 and KS will go high while lines K1 and K8 remain low. When the line KS goes high, the output of an invertor 364 will go low and toggle the first flip-flop 312. When the first flip-flop 312 is set, and the dollar GATE signal indicates that the recirculating memory is not in the dollar field time slots 25, 26, 27 and 28, a GATE 366 will be enabled to allow the second flip-flop 312 to set synchronized by the MPP signal from the memory control section 208.

When the second flip-flop 312 generates a $\overline{Q}$ output, the first flip-flop 312 is reset. The second flip-flop 312 remains set indicating that the new character should be entered into the recirculating path. When the flip-flop 357 is set and the bit in the control channel passing through an inverter 370 is high indicating that the next control bit location will be low, the recirculating memory path is now ready for entry of a character. At that instant, the output of the gate 368 goes high to enable the gate 372. The gate 372 in turn enables gates 374 and 376. Note that the gate 376 will only be enabled if key 8 is depressed and the K8 line is in the high state. Since we are presently concerned with entering a character 6, the line K8 is low. As a result, the outputs "V", " ← " and " → " are high as well as the $ from a decoder 378 so as to enable the gate 374.

With this gate enabled, the character is entered into the recirculating memory path at the transfer gates 304 in response to the output from an enabled gate 380 and a series connected inverter 382. This permits entry of the data at the transfer gates 306 into the recirculating memory path through the transfer gates 304. The character 6 has now been entered into the recirculating memory path and may be applied to the display section 204 through display gates 384, 386, 388, and 390.

A similar procedure is followed once the account number field is filled and the terminal is ready for entry of the dollar characters into the dollar amount field of the recirculating memory. By utilizing the output from the gate 322 to establish an internal recirculating memory path in the register 300 having only 32 bits long, successive dollar characters may be entered at position 28 and previously entered characters shifted to the proceeding position.

3.4 Transmit and Print Control Section

This section comprises a transfer gate 384 for the fixed data which is to be entered on the draft 16 including the merchant code and mechanical sequence count. This data is then entered into storage element 386 before the printing period.

A divide-by-12 counter 388 controls the print wheel position which is compared with the position which is stored in the element 386. An additional counter comprising elements 390 and 392 determine the data which will be taken out of memory.

This section also includes a pair of comparators. A first comparator 394 is located between the storage element 386 and the counter element 388. This comparator compares the position of the print wheel 508 as shown in FIGS. 16 against the data in memory. Another comparator 396 compares the print wheel position count with the recirculating memory position count generated in the memory control section 208. When the print wheel position P equals the recirculating memory position M, data is transferred from the recirculating memory to the storage element 386. A flip-flop 398 and associated gating networks switch the transmission and print control section from a print mode of operation to a transmit mode of operation and vice versa.

A one-shot multivibrator 400 is provided for controlling a solenoid 512 of a print hammer 514 best shown in FIG. 16. The stepper motor 508 of FIG. 17 advances in response to control signals generated by a gating network 402 associated with control lines S1, S2, S3 and S4. One of the functions provided by the gating network 402 is to provide proper step control signals to assure synchronization between the counter 388 and a feedback signal from the print wheel 508 representing the zero position for the wheel.

3.5 Communications Data Control and Mechanics Control Section

This section comprises a five bit register 404 receiving an input from the communications section 206, a data storage element 406 coupled to the register 404, a decoder 408 connected between the register 404 and the storage element 406, and instruction storage flip-flops 410 and 412. A bit counter 414 sets the instruction control flip-flop 412 to control the time for receiving an instruction or receiving data.

Request control logic and error control logic is also provided in this section. The error control flip-flop comprises cross-coupled NAND gates 415. A request flip-flop comprises two cross-coupled NAND gates 416. A time out function indicates that the terminal has been on-line or requesting communications for too long a period. This is provided by a single shot multivibrator 418 and associated gating.

3.6 Communications Section

This section provides the terminal with its own modem which accomplishes modulation and demodulation at two levels, phase and tone. The details of such a modem are well known to those of ordinary skill in the art and are not therefore set forth in detail herein.

3.7 The Exterior Of The Terminal

As shown in FIG. 13, the terminal 10 is designed as a counter-top unit. As mentioned previously, the 4 × 4 matrix 500 of keys is provided for entry of the data by a clerk. The matrix includes a back space key " ← " and a forward space key " → " to allow the operator to back space or forward space in the display without erasing the positions which are passed during back spacing or forward spacing. In addition, a blanking key B is provided to allow the clerk to leave a blank in a field. A verification key V is provided to initiate transmission from the terminal. In addition numerical keys 0–9 are provided along with a cents key and a dollar key.

Response lights 502 which have also been previously mentioned include an upper most green light, an adjacent yellow light, and two white lights in the lowermost position. The green light indicates that the transaction has been authorized, the yellow light indicates a standby condition, and the white lights indicate local or non-local malfunctions. The numeric display 504 includes an account field at the left of the display and dollars and cents fields at the right of the display. As each of the keys in the matrix 500 is depressed, the corresponding character appears on the display.

Before any of the keys are depressed, a draft 18 and a credit card 16 must be inserted into the terminal. This is accomplished at a hinged door 520 located on top of the terminal 10. Suitable interlock means may be provided in connection with the door 520 to assure the proper insertion of the draft 18, the card 16 and proper closing of the door 520 before verification proceeds.

3.8 The Mechanical Structure of the Terminal

Figure 15:
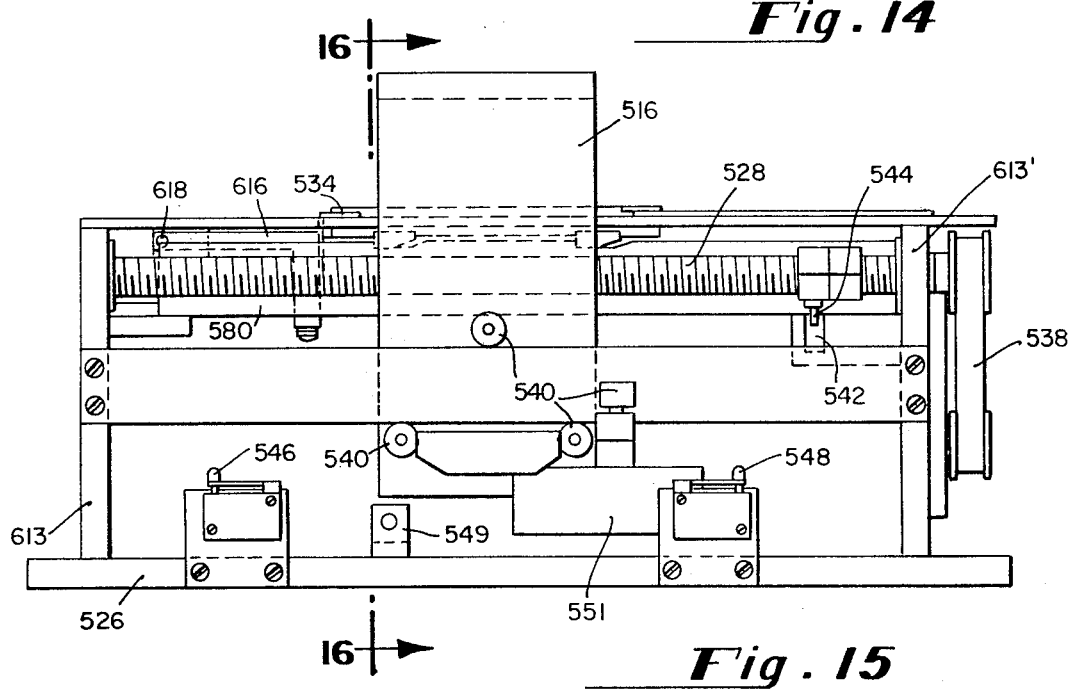
FIG. 15 is a side elevational view of the interior of a system terminal.

The interior of the terminal 10 will now be described with reference to FIGS. 14 and 15. The carriage 506 is mounted for movement along rails 524 located above a base 526. The carriage 506 which is advanced by jack screws 528 moves across a card bed 530 which is adapted to receive a credit card as shown in FIG. 14 and a merchant or terminal plate 532 on the bottom with the draft 18 resting on top. In order to firmly position the draft 18, a clamp 534 is provided. The jack screws 528 which advance the carriage 506 are driven by a motor 536 and an associated belt 538. As the rotating jack screws 528 advance the carriage 506, rollers 540 which are mounted on side plates 516 of carriage 506 move along the rail 524.

The carriage 506 is adapted to carry a printing mechanism for applying transaction data in machine readable form to the sales draft 18 as well as imprinting rollers for applying impressions of the credit card 16 and the merchant plate 532 to the sales draft 18. In order to determine when the carriage 506 has advanced a predetermined amount along the transaction draft 18 to another printing position, preferably .05 inches or an integral multiple thereof, a light source and a photo transistor are located on opposite sides of the gap 542. A rotating shutter comprising a pin-nut 544 mounted on one of the jack screws 528 interrupts the path between the light source and the photo transistor whenever carriage 506 has advanced by 0.5 inches from the previous interruption. The control signal generated by the photo transistor is then applied to the transmission and print control section 210 where it is counted by a factor appropriate to the desired horizontal printing pitch (e.g. counted by 2 for a printing pitch of 0.10 inches). Additional control signals which are applied to the section 210 are generated by microswitches 546 and 548 which are triggered by the carriage 506 to indicate that the carriage is advanced to the extremities on the rails 524. When the carriage 506 is advanced in the forward position to the microswitch 548, a signal is generated to reset the terminal logic circuitry. When the carriage 506 is advanced in the return direction to actuate the switch 546, a signal is generated acknowledging completion of the transaction to the central processing unit 14. A phototransistor — light source switch 549 is triggered by a carriage-borne shutter to indicate the position of the carriage for the start of the printing operation.

The printing and imprinting aspects of the carriage 506 may be better understood with reference to FIG. 16. As previously discussed, the carriage 506 is advanced by the jack screws 528 which are in turn driven by the motor 536 and the associated belt 538. As the jack screws 528 rotate, the carriage 506 is moved along the rails 524 on rollers 540.

In accordance with one very important aspect of the invention, a printing mechanism is suspended from the top plate 550 of carriage 506 for applying transaction data in machine readable form to the transaction draft 18 on the card bed 530. The printing mechanism comprises the printing wheel 508 which is driven by a stepper motor not shown. The stepper motor is coupled to a shaft 552 carrying a gear 554. As the gear 554 is advanced by the stepper motor and engages a gear 556 coupled to the printing wheel 508, the various characters located circumferentially about the print wheel 508 are positioned directly above the transaction draft 18 at a slot 557 for printing. The zero (0) position of the print wheel 508 may be determined by phototransistor-light source switch which senses an aperature 559 in the gear 556. This serves to synchronize the print wheel 508.

Directly beneath the print wheel 508 and the card bed 530 is the print hammer 514. A yoke 560 is provided for guiding the print hammer 514 toward the print wheel 508. At the time the print wheel 508 is properly positioned, the solenoid 512 of the print hammer mechanism is energized in response to a print signal from the transmission and print control section 210 so as to pivot an arm 562 about a fulcrum point 564. After actuation of the solenoid 512 and the appropriate character on the print wheel 508 has been printed on the sales draft 18 on the bed 530 by forcing the hammer 514 and the draft 18 against the appropriate character of the print wheel 508, a spring 566 and a spring 568 return the hammer 514 and the arm 562 to the rest position. The printing commences after the switch 549 is triggered by a carriage mounted shutter 551 indicating the first print position.

In accordance with another important aspect of the invention, a spring biased imprinting mechanism is also supported by the top plate 550 of the carriage. By providing springs 570 which bear upon axles 572 of the imprinting rollers 574, the imprinting rollers are forced downwardly onto the card bed 530 to assure adequate pressure between the draft 18 and the credit card 16 as well as the terminal plate 532. In other words, the spring loading of the imprinting rollers 574 assures proper pressure bears on the draft 18 on the card bed 530.

Note that separate imprinting rollers are provided for the card 16 and the merchant plate 532. In order to properly locate the card, an L-shaped barrier member 576 is located at the edges of the rollers 574.

3.9 The Mechanical Operation of the Terminal

It should be understood that the carriage, as shown in FIG. 16, is presently returning after having printed and imprinted on the draft 18 (not shown). In this connection, note that there is a considerable space between the imprinting rollers 574 and the top of the card bed 530 even though the axles 572 are spring loaded to the lower most position. This space is provided in accordance with one very important aspect of the invention so as to prevent double imprinting during the return of the carriage 506 to the home position. The manner in which this space is achieved will now be described with reference to FIG. 17.

The card bed 530 is actually supported on a pair of movable rails 580 having notches 582 and a camming surface 584. When the carriage 506 is at the end of its print movement (as indicated by the arrows of FIG. 17), the card bed 530 is dropped to the lower most position with transverse supporting members 586 resting in the notches 582. To assure that the card bed 530 remains amply clear of the imprint rollers 574, the members 586 are spring loaded against the bottom of the notch 582.

As best shown in FIG. 16, the spring biasing for loading of the card bed 530 is achieved by bolts 588 which extend through a plate 590 attached to the card bed 530. The bolts 588 also extend through an inverted U-shaped member 592 having projections 594 which extend beneath the movable rails 580 by placing springs 596 between a bight 598 of the U-shaped member 592 and a washer 600 secured to the ends of the bolts 596 by nuts 602. Thus the springs 596 tend to pull the member 590 downwardly to assure that the card bed 530 is clear of the print rollers 574.

In order to achieve imprinting as the carriage moves in the forward direction as shown in FIG. 18, the rails 580 are moved longitudinally to the position shown in FIG. 18 during the end portion of the prior cycle's return movement of carriage 506. Note the transverse member 586 have been cammed upwardly by the camming surface 584 so as to rest upon the upper surface 604 of the rails 580. This movement of the rails 580 is actually achieved as the carriage including a striker block 606 returns to the home position after printing and imprinting. As the carriage reaches the home position, a surface 608 of the striker block 606 strikes the end of the bolt 610 which is secured to transverse member 611 attached between the rails 580. This drives the rails 580 to the left. To assure that the rail 580 will remain in the left most position, a magnetic latch 612 is mounted on the member 611 for engaging an end plate 613.

Simultaneously, a camming surface 614 of the striker block 606 has forced a clamp arm 616 upwardly thereby raising the clamp 534 off the draft 18 on the card bed 530 to allow removal of the draft. The clamp arm 616 is pivoted about at a pin 618.

The carriage 506 is now advanced with the spring loaded imprint rollers 574 bearing down upon the card bed 530. Note further that as the carriage 506 moves away from the home position, the camming surface 614 will be moved to the right to permit the clamp arm 616 to return to the clamping position under the influence of a bias spring 620.

When printing and imprinting is completed, the striker block 606 will have advanced to position 606' which has been shown in phantom in FIG. 17. At this time, a bolt 610' which is secured to a transverse member 611' will be engaged by the striker block 606 to move the rails to the right to the position shown in FIG. 17. A magnetic latch 612' carried by the member 611' as shown in FIG. 19 latches the rails 580 in place against the other end plate 613'.

What is claimed is:

1. A system for verifying the credit of credit card holders prior to transactions:

a plurality of credit card sets corresponding to a plurality of credit card plans, each credit card in each of said sets carrying indicia identifying a credit card plan and an account number in said credit card plan;

a plurality of point-of-transaction terminals, each of said terminals adapted to generate signals representing transaction data including the account number, the dollar amount of the transaction and the credit card plan;

a communication link between each of said terminals and a central location for transmitting said signals representing the transaction data to said central location;

a central processing means located at said central location and connected to said communication link, said central processing means receiving the transmitted signals representing the transaction data, said central processing means including:

a means for storing transaction authorization requirements for each credit card plan, said requirements differing for different credit card plans and being the same for a substantial number of credit cards in a given credit card plan for various transactions at a given terminal;

a means for retrieving the stored transaction authorization requirements of a transmitted credit card plan; and a means for determining if the transmitted dollar amount satisfies said stored authorization requirements for said transmitted credit card plan.

2. A system of claim 1 wherein said central processing means generates signals representing transaction authorization and refusal and said communication link transmits said transaction authorization and refusal signals to the appropriate terminal.

3. A system of claim 2 including
   visual display authorization means adapted to be attended by an operator; and
   an additional communication link between said visual display means and said central processing means for transmitting operator authorization of a transaction.

4. The system of claim 1 wherein said central processing means further comprises:
   a means for storing the status of account numbers in each of said credit card plans; and
   a means for retrieving the stored status of a transmitted account number.

5. The system of claim 4 wherein each of said terminals is adapted to generate signals identifying said terminals, said stored transaction requirements for a given credit card plan varying as a function of the particular terminal involved in each transaction.

6. The system of claim 1 wherein said central processing means comprises means for storing a log of each of said transactions occurring at each of said terminals.

7. The system of claim 2 wherein said central processing means including buffer storage means for each of said terminals for indicating the pendency of transactions at the terminals.

8. The system of claim 1 wherein each of said terminals comprises means for applying machine readable transaction data to a transaction draft.

9. The system of claim 8 wherein each of said terminal means comprises means for applying transaction authorization data from said central processing means to said transaction draft.

10. A method of checking credit of credit card holders belonging to different credit card plans by utilizing a single remote terminal located at each remote transaction point and a central processing means comprising a digital computer and digital storage means located at a central location, said method comprising the steps of:

storing transaction authorization requirements for each of said credit card plans in said digital storage means, said transaction authorization requirements varying as a function of the particular credit card plan involved in the transaction;

generating signals at said remote terminals representing transaction data, said transaction data including the credit card plan involved in a transaction and the dollar amount of the transaction;

transmitting said signals representing said transaction data from said remote terminals to said central processing means;

retrieving from said digital storage means transaction authorization requirements for each transmitted credit card plan; and determining with said digital computer if the transmitted transaction data satisfies the retrieved transaction authorization requirements.

11. A method of claim 31 wherein said transaction authorization requirements for a given credit card plan vary as a function of the particular terminal involved in each transaction, said method further including the steps of:

generating signals at said terminals representing transaction data including the remote terminal involved in each transaction;

transmitting from said terminals said signals representing the terminal involved in each transaction to said central location so as to permit a determination by said digital computer of whether the transmitted dollar amount of the transaction satisfies the transaction authorization requirements for the particular terminal and particular credit card plan involved in each transaction.

12. The method of claim 11 further comprising the steps of:

storing the status of accounts in each of said credit plans at said digital storage means, generating signals representing transaction data including the account number involved in each transaction at said remote terminals, transmitting said signals representing said transaction data including each said account number to said central location, determining with said digital computer the status of each transmitted account number.

13. The method of claim 10 including the step of performing a check-digit validation on the identified account for the transmitted credit card plan at said central processing means.

14. The method of claim 13 including the step of determining extraordinary activity for the identified account at said central processing means.

* * * * *